United States Patent
Uemura et al.

(10) Patent No.: US 11,178,718 B2
(45) Date of Patent: Nov. 16, 2021

(54) TERMINAL DEVICE, BASE STATION DEVICE, COMMUNICATION METHOD, AND INTEGRATED CIRCUIT

(71) Applicant: SHARP KABUSHIKI KAISHA, Sakai (JP)

(72) Inventors: Katsunari Uemura, Sakai (JP); Shohei Yamada, Sakai (JP); Yasuyuki Kato, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/561,497

(22) PCT Filed: Mar. 25, 2016

(86) PCT No.: PCT/JP2016/059579
§ 371 (c)(1),
(2) Date: Sep. 25, 2017

(87) PCT Pub. No.: WO2016/153025
PCT Pub. Date: Sep. 29, 2016

(65) Prior Publication Data
US 2018/0070403 A1   Mar. 8, 2018

(30) Foreign Application Priority Data

Mar. 25, 2015 (JP) .............................. JP2015-062051

(51) Int. Cl.
*H04W 76/27* (2018.01)
*H04W 4/70* (2018.01)
(Continued)

(52) U.S. Cl.
CPC ............... *H04W 76/27* (2018.02); *H04L 1/08* (2013.01); *H04W 4/70* (2018.02); *H04W 48/16* (2013.01);
(Continued)

(58) Field of Classification Search
CPC ....... H04W 76/27; H04W 4/70; H04W 48/16; H04W 74/0833; H04W 76/10; H04W 72/04; H04L 1/08; H04L 1/20
(Continued)

(56) References Cited

U.S. PATENT DOCUMENTS 9,499,995 B2 * 11/2016 Xiong ................... H04W 76/14
2014/0098761 A1 * 4/2014 Lee ..................... H04W 72/005
370/329
(Continued)

FOREIGN PATENT DOCUMENTS

WO   2014/077766 A1   5/2014

OTHER PUBLICATIONS

PRACH coverage enhancement for Rel-13 MTC UEs. Source: SHARP; Meeting # 80 ; Athens, Greece, Feb. 9-13, 2015 (Year: 2015).*
(Continued)

*Primary Examiner* — Hassan A Phillips
*Assistant Examiner* — Mohammed S Chowdhury
(74) *Attorney, Agent, or Firm* — ScienBiziP, P.C.

(57) ABSTRACT

Provided is technology relating to: a terminal device, a base station device, a communication system, a communication method, and an integrated circuit capable of efficiently performing a radio resource control procedure. The terminal device is provided with a first sublayer and a second sublayer that is a lower sublayer than the first sublayer. The first sublayer creates an RRC message corresponding to an RRC procedure and starts a timer relating to the RRC
(Continued)

procedure on the basis of coverage level information. The second sublayer executes a random access procedure relating to the RRC procedure on a serving cell, determines the coverage level information in the random access procedure, and selects a random access preamble group on the basis of the determined coverage level information.

10 Claims, 9 Drawing Sheets

(51) Int. Cl.
*H04L 1/08* (2006.01)
*H04W 48/16* (2009.01)
*H04L 1/20* (2006.01)
*H04W 76/10* (2018.01)
*H04W 72/04* (2009.01)
*H04W 74/08* (2009.01)

(52) U.S. Cl.
CPC ............... *H04L 1/20* (2013.01); *H04W 72/04* (2013.01); *H04W 74/0833* (2013.01); *H04W 76/10* (2018.02)

(58) Field of Classification Search
USPC .......................................................... 370/329
See application file for complete search history.

(56) References Cited

U.S. PATENT DOCUMENTS

| | | | | |
|---|---|---|---|---|
| 2015/0016312 A1* | 1/2015 | Li | ...................... | H04W 74/006 370/280 |
| 2015/0117233 A1* | 4/2015 | Wong | ...................... | H04L 1/188 370/252 |
| 2015/0117410 A1* | 4/2015 | Wu | ...................... | H04L 1/08 370/331 |
| 2015/0181575 A1* | 6/2015 | Ng | ...................... | H04W 72/042 370/329 |
| 2015/0271763 A1* | 9/2015 | Balachandran | ....... | H04L 7/0054 370/338 |
| 2016/0192269 A1* | 6/2016 | Kim | ...................... | H04W 36/30 370/332 |
| 2016/0192376 A1* | 6/2016 | Lee | ...................... | H04W 48/20 370/252 |
| 2016/0242206 A1* | 8/2016 | Ohlsson | ............ | H04W 72/1231 |
| 2017/0055250 A1* | 2/2017 | Lim | ...................... | H04L 5/0053 |
| 2017/0142741 A1* | 5/2017 | Kaur | ...................... | H04W 72/02 |
| 2017/0171764 A1* | 6/2017 | Dimou | .................. | H04L 1/1848 |
| 2017/0339531 A1* | 11/2017 | Kim | ...................... | H04W 76/40 |
| 2018/0007605 A1* | 1/2018 | Eriksson | ............... | H04W 24/10 |

OTHER PUBLICATIONS

PRACH enhancement for MTC; Source: Intel Corporation; San Francisco, USA, Nov. 17-21, 2014 (Year: 2014).*
PRACH coverage extension for MTC devices; Source: Alcatel-Lucent, Alcatel-Lucent Shanghai Bell; Chicago, USA; Apr. 15-19, 2013 (Year: 2013).*
3GPP TSG RAN WG1 Meeting #80; R1-150030 , Athens, Greece, Feb. 9-13, 2015; Source: Ericsson, Title: PRACH Repetition for MTC. (Year: 2015).*
3GPP TSG RAN WG1 Meeting #75;R1-135645, Source: Ericsson, Title: Random access for enhanced coverage MTC UE, San Francisco, CA, USA, Nov. 11-15, 2013 (Year: 2013).*
Source: Ericsson; Title: Email discussion report on [91#24][LTE/MTC] Timer handling for extended coverage; 3GPP TSG-RAN WG2 #91bis; Malmo Sweden, Oct. 5-9, 2015; Tdoc R2-154870.
Source: Ericsson; Title:Rel-12 agreements for MTC;3GPP TSG-RAN WG1 Meeting #78bis; Ljubljana, Slovenia, Oct. 6-10, 2014; R1-143784.
3rd Generation Partnership Project; Technical Specification Group Radio Access Network; Study on provision of low-cost Machine-Type Communications (MTC) User Equipments (UEs) based on LTE (Release 12);3GPP TR 36.888 V12.0.0 (Jun. 2013).
"Cellular system support for ultra-low complexity and low throughput Internet of Things (CIoT)" (Release 13) 3GPP TR 45.820 V1.0.0 (Mar. 2015).

* cited by examiner

TERMINAL DEVICE, BASE STATION DEVICE, COMMUNICATION METHOD, AND INTEGRATED CIRCUIT

TECHNICAL FIELD

The present invention relates to technology of a terminal device, a base station device, a communication method, and an integrated circuit that efficiently perform a radio resource control procedure.

BACKGROUND ART

The 3rd Generation Partnership Project (3GPP), which is a standardization project, has standardized Evolved Universal Terrestrial Radio Access (EUTRA), in which high-speed communication is realized by adopting an orthogonal frequency division multiplexing (OFDM) communication method and flexible scheduling in a unit of prescribed frequency and time called a resource block. EUTRA may also be referred to as Long Term Evolution (LTE).

Moreover, the 3GPP has been considering LTE Advanced (also referred to as LTE-A) which realizes higher-speed data transfer and has upper compatibility with LTE.

For LTE Advanced, a cost reduction (also referred to as low complexity) of a terminal device used for machine type communication (MTC) or machine to machine communication (M2M) has been considered (NPL 1). Hereinafter, a terminal device or a communication device designed for MTC/M2M and having the function capable of (supporting) a cost reduction and/or coverage enhancement is also referred to as machine type communication user equipment (MTCUE). However, the use of such a terminal device is not limited to machine type communication nor machine to machine communication.

The 3GPP has proposed, in order to realize low cost MTCUE, narrowing of a transmission and reception bandwidth, a reduction of the number of antenna ports/the number of RF chains, a reduction of a transmission and reception data transfer rate, adoption of a half-duplex frequency division duplex scheme, a reduction of transmit and receive power, an extension of discontinuous reception intervals, and the like. Furthermore, the 3GPP has also proposed, as a method of realizing the low cost MTCUE, a reduction of the maximum bandwidth of a transmission and reception RF circuit and a transmission and reception baseband circuit of MTCUE, and the like.

Furthermore, in order to compensate for degradation in reception and transmission performance due to influence of the reduction in the number of the antenna ports or the like, a method has been considered in which downlink data or a downlink signal is repetitively transmitted to MTCUE for one data transmission, and MTCUE repetitively transmits uplink data or an uplink signal to a base station device for one data transmission.

Additionally, not only the cost reduction, hut also coverage enhancement (coverage improvement), coverage being a transmission and reception range of MTCUE, has been considered. For example, with respect to a space such as a basement which is outside a communication area due to a large signal attenuation in the related art, the coverage enhancement has been considered. In order to enhance the coverage, a method has been considered in which the base station device repetitively transmits downlink data or a downlink signal to MTCUE, and MTCUE repetitively transmits uplink data or an uplink signal to the base station device (NPL 2).

For example, the base station device repetitively transmits a physical broadcast channel PBCH to MTCUE multiple times within 40 ms. Furthermore, in a random access procedure, MTCUE repetitively transmits the same random access preamble with multiple resources of a physical random access channel PRACH. The base station device which has received the random access preamble repetitively transmits a random access response message. Note that, the base station device notifies MTCUE in a cell of the number of repetitions (the number of attempts) with system information, or dedicatedly notifies MTCUE (NPL 2).

CITATION LIST

Non Patent Literature

NPL 1: 3GPP TR (Technical Report) 36.888, V12.0.0 (June 2013), Study on provision of low-cost Machine-Type Communications (MTC) User Equipments (UEs) based on LTE (release 12)

NPL 2: "Rel-12 agreements for MTC", R1-143784, 3GPP TSG-RAN WG1 Meeting #78bis Ljubljana, Slovenia, 6-10 Oct. 2014

SUMMARY OF INVENTION

Technical Problem

Repetitive transmissions or repetitive receptions in order to enhance coverage may increase the time necessary for a procedure for changing from an idle state to a connected state. Likewise, the time necessary for a procedure for changing a serving cell due to a handover or the like may also increase.

In the related art, in order to configure the maximum time for these procedures, a base station device notifies a terminal device of timer information indicating the maximum time for each of the procedures. However, these pieces of timer information of the related art have not taken into consideration the fact that time necessary up to completion of each of the procedures increases depending on the number of repetitions of the transmission and the reception, which prevents a terminal device capable of coverage enhancement from using the timer information of the related art as it is.

For example, when the timer information of the related art is used as it is, the timer expires before a radio resource control (RRC) procedure is completed, which in turn causes a problem that the number of failures of the radio resource control procedure increases, and thus unnecessary interference signals increase. Furthermore, repetitive failures of the radio resource control procedure cause another problem that power consumption of the terminal device increases. However, a specific solution for these problems has not yet been considered.

In the light of the above-described circumstances, an object of the present invention is to provide technology relating to a terminal device, a base station device, a communication system, a communication method, and an integrated circuit capable of efficiently performing a radio resource control procedure to solve at least one of the above-described problems.

Solution to Problem

In order to accomplish the object described above, the following means are provided. That is, a terminal device according to an embodiment of the present invention is a terminal device communicating with a base station device. The terminal device includes a first sublayer and a second sublayer being a lower sublayer than the first sublayer. The first sublayer creates an RRC message corresponding to an RRC procedure, and starts a timer relating to the RRC procedure on the basis of coverage level information. The second sublayer executes a random access procedure relating to the RRC procedure on a serving cell, determines the coverage level information in the random access procedure, and selects a random access preamble group on the basis of the determined coverage level information.

Furthermore, in the terminal device according to the embodiment of the present invention, when determining that the random access procedure has succeeded, the second sublayer indicates the coverage level information to the first sublayer.

Furthermore, the second sublayer of the terminal device according to the embodiment of the present invention indicates, to the first sublayer, the coverage level information indicated by a random access response received in the random access procedure.

Furthermore, in the terminal device according to the embodiment of the present invention, the RRC procedure is an RRC connection establishment procedure, the first sublayer is an RRC sublayer, and the second sublayer is a MAC sublayer.

Furthermore, a base station device according to an embodiment of the present invention is a base station device communicating with a terminal device. The base station device transmits, to the terminal device including a first sublayer and a second sublayer being a lower sublayer than the first sublayer, as a timer value relating to an RRC procedure executed in the first sublayer, a timer value relating to the RRC procedure corresponding to the coverage level information. A random access procedure relating to the RRC procedure executed in the second sublayer is executed by the terminal device on a serving cell, the coverage level information is determined by the terminal device in the random access procedure, and a random access preamble group is selected by the terminal device on the basis of the determined coverage level information.

Furthermore, a communication method according to an embodiment of the present invention is a communication method of a terminal device communicating with a base station device, the terminal device including a first sublayer and a second sublayer being a lower sublayer than the first sublayer. The communication method includes at least the steps of creating an RRC message corresponding to an RRC procedure, and starting a timer relating to the RRC procedure on the basis of coverage level information in the first sublayer, and further includes at least the steps of executing a random access procedure relating to the RRC procedure on a serving cell, and determining the coverage level information in the random access procedure and selecting a random access preamble group on the basis of the determined coverage level information in the second sublayer.

Furthermore, the communication method according to the embodiment of the present invention, further includes the step of indicating the coverage level information to the first sublayer when the second sublayer determines that the random access procedure has succeeded.

Furthermore, a communication method according to an embodiment of the present invention is a communication method of a base station device communicating with a terminal device. The communication method includes at least the step of transmitting, to the terminal device including a first sublayer and a second sublayer being a lower sublayer than the first sublayer, as a timer value relating to an RRC procedure executed in the first sublayer, a timer value relating to the RRC procedure corresponding to the coverage level information. A random access procedure relating to the RRC procedure executed in the second sublayer is executed by the terminal device on a serving cell, the coverage level information is determined by the terminal device in the random access procedure, and a random access preamble group is selected by the terminal device on the basis of the determined coverage level information.

Furthermore, an integrated circuit according to an embodiment of the present invention is an integrated circuit mounted on a terminal device communicating with a base station device, the terminal device including a first sublayer and a second sublayer being a lower sublayer than the first sublayer. The integrated circuit causes the terminal device to perform at least the function of creating an RRC message corresponding to an RRC procedure and starting a timer relating to the RRC procedure on the basis of coverage level information in the first sublayer; and executing a random access procedure relating to the RRC procedure on a serving cell, and determining the coverage level information in the random access procedure and selecting a random access preamble group on the basis of the determined coverage level information in the second sublayer.

Furthermore, an integrated circuit according to an embodiment of the present invention is an integrated circuit mounted on a base station device communicating with a terminal device. The integrated circuit causes the base station device to perform at least the function of transmitting, to the terminal device including a first sublayer and a second sublayer being a lower sublayer than the first sublayer, as a timer value relating to an RRC procedure executed in the first sublayer, a timer value relating to the RRC procedure corresponding to the coverage level information. A random access procedure relating to the RRC procedure executed in the second sublayer is executed by the terminal device on a serving cell, the coverage level information is determined by the terminal device in the random access procedure, and a random access preamble group is selected by the terminal device based on the determined coverage level information.

Although this specification discloses each embodiment in terms of technology relating to a terminal device, a base station device, a communication system, a communication method, and an integrated circuit capable of efficiently performing a radio resource control procedure, a communication method applicable to each of the embodiments is not limited to a communication method used for EUTRA (LTE, LTE-A).

For example, technology described in this specification may be used in various communication systems using such as code division multiple access (CDMA), time division multiple access (TDMA), frequency division multiple access (FDMA), orthogonal FDMA (OFDMA), single carrier FDMA (SC-FDMA), other access schemes, or the like. Furthermore, in this specification, "system" and "network" may be used as synonyms.

Advantageous Effects of Invention

According to the present invention, technology of a terminal device, a base station device, a communication system, a communication method, and an integrated circuit capable of efficiently performing a radio resource control procedure can be provided.

DESCRIPTION OF EMBODIMENTS

Figure 1:
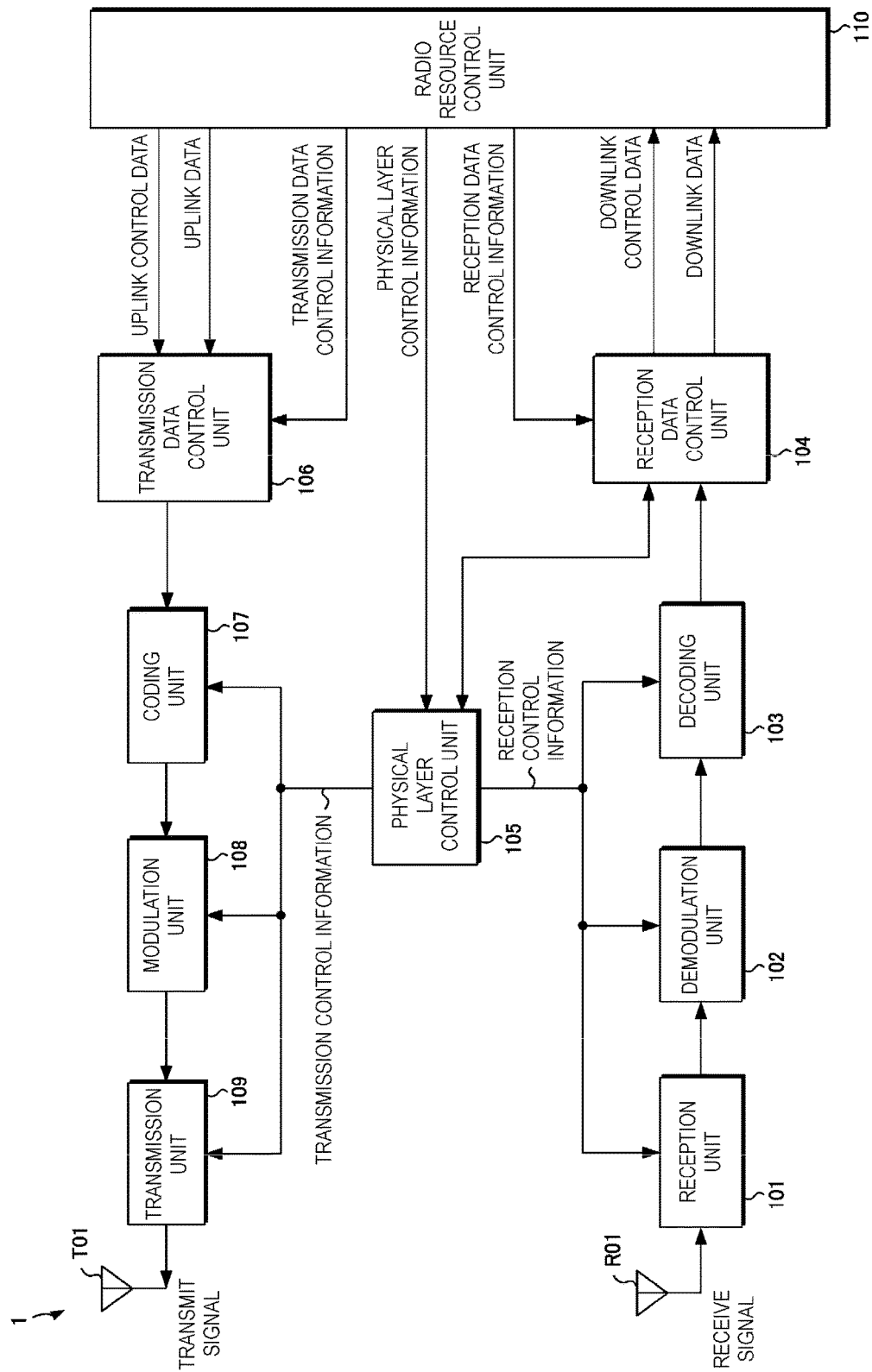
FIG. 1 is a diagram illustrating an example of a constitution of a terminal device according to an embodiment of the present invention.

Technology relating to each embodiment of the present invention will be simply described below.
Channel/Signal The LTE (EUTRA) channel includes a logical channel, a transport channel, and a physical channel. "Channel" refers to a medium used for transmission and reception of a signal, and the logical channel defines a type of data transfer service transmitted and received in a medium access control (MAC) layer. The transport channel defines characteristics of data transmitted over a radio interface and how the data is transmitted.

The physical channel refers to a physical medium which carries data transferred to a physical layer by the transport channel. In the present invention, the "physical channel" may be used as a synonym of "signal." In a communication system evolved from EUTRA (LTE, LTE-A), a new physical channel may be added, the structure (constitution) or format of the existing physical channel may be changed, or another structure (constitution) or format of the existing physical channel may be added; however, the description of each embodiment of the present invention will not be affected even in such a case.

In EUTRA, scheduling of a physical channel or a physical signal is managed by using a radio frame. One radio frame is 10 ms in length, and one radio frame is constituted of 10 subframes. In addition, one subframe is constituted of two slots (i.e., one subframe is 1 ms in length, and one slot is 0.5 ms in length). Moreover, scheduling is managed by using a resource block as a minimum unit of scheduling to which a physical channel is allocated. The "resource block" is defined by a certain frequency domain constituted of a set of multiple subcarriers (e.g., 12 subcarriers) on a frequency axis and a domain constituted of a certain transmission time slot (one slot).

Downlink in EUTRA will be described. The downlink logical channel includes a broadcast control channel BCCH, a paging control channel PCCH, a common control channel CCCH, a dedicated control channel DCCH, and a dedicated traffic channel DTCH.

The broadcast control channel BCCH is a logical channel used for broadcasting system information. The paging control channel PCCH is a logical channel used for transmitting paging information, and used when the network pages a terminal device, or notifies the terminal device of update of the system information. The common control channel CCCH is a logical channel used for transmitting control information between the terminal device and the network. The common control channel CCCH is used by a base station device in the downlink when the terminal device has yet to transition to a state in which radio resource control (RRC) connection has been established with the network (RRC connected state or RRC_CONNECTED)).

The dedicated control channel DCCH is a point-to-point bi-directional channel, and is a logical channel used for transmitting dedicated control information between the terminal device and the network. The dedicated control channel DCCH can be used between the terminal device in the RRC connected state and the base station device. The dedicated traffic channel DTCH is a point-to-point bi-directional channel, is a channel dedicated to a certain terminal device, and is a logical channel used for transferring (transmitting) user information (unicast data).

The downlink transport channel includes a broadcast channel BCH, a paging channel PCH, and a downlink shared channel DL-SCH.

The broadcast channel BCH is broadcast throughout a cell with a format fixedly defined in advance (Transport format). The downlink shared channel DL-SCH supports a hybrid automatic repeat request (HARQ), dynamic link adaptation control, dynamic or semi-static resource allocation, and discontinuous reception (DRX). Furthermore, the paging channel PCH supports discontinuous reception broadcast throughout a cell.

The downlink physical channel and physical signal of EUTRA will be described.

A synchronization signal is constituted of three types of primary synchronization signals (PSS) and secondary synchronization signals (SSS) constituted of 31 types of codes that are interleaved in the frequency domain. 504 patterns of cell identifiers (physical cell identities (IDs); PCIs) for identifying base station devices, and frame timing for radio synchronization are indicated by the combinations of the PSSs and the SSSs. The terminal device identifies the physical cell ID of a received synchronization signal by cell search.

A downlink reference signal is classified into multiple types depending on their use. For example, cell-specific reference signals (cell-specific RSs; CRSs) are pilot signals transmitted with prescribed power on each cell and are downlink reference signals periodically repeated in the frequency domain and the time domain under a prescribed rule. The terminal device receives the cell-specific RS and is thereby enabled to measure the reception quality on each cell. The terminal device can also use the cell-specific RS as a reference signal for demodulation of a physical downlink control channel or a physical downlink shared channel transmitted at the same time as the cell-specific RS.

The sequence used for the cell-specific RS is a sequence unique to each cell. The cell-specific RS may be transmitted from the base station device in all downlink subframes, or may be transmitted only in downlink subframes designated by the base station device. Furthermore, the terminal device may receive the cell-specific RS in all the downlink subframes, or may receive only in downlink subframes designated by the base station device.

The downlink reference signal is also used for estimation of downlink channel variations. The downlink reference signal used for estimation of downlink channel variations is referred to as "channel state information reference signals (CSI-RSs or CSI reference signals)." Furthermore, the CSI reference signal may be a signal that is not actually transmitted or is transmitted with zero-power. On the other hand, the CSI reference signals to be actually transmitted may also be referred to as non-zero power channel state information reference signals (NZP CSI-RSs). Furthermore, a downlink radio resource used for measurement of an interference component may be referred to as a channel state information-interference measurement resource (CSI-IMR) or CSI-IM resource.

A downlink reference signal individually configured for the terminal device is referred to as UE-specific reference signals (URS), a demodulation reference signal (DMRS), and is referred to for a channel compensation process for demodulating the physical downlink control channel, an enhanced physical downlink control channel, or the physical downlink shared channel.

The physical broadcast channel (PBCH) is transmitted for notification (configuration) of a master information block (MIB) that is shared by the terminal devices within the cell. The base station device makes notification of (transmits) a master information block message including the MIB on the physical broadcast channel. Information notified to (configured for) the terminal device with the master information block message, in other words, information notified with the MIB includes a downlink frequency bandwidth, a system frame number, configuration information on a physical channel relating to hybrid ARQ (PHICH), and the like.

The base station device transmits cell common information other than the master information block to the terminal device, using a system information block type 1 (SIB1) message by which a position and periodicity of a subframe are pre-defined and other types of system information messages (for example, system information block type 2 to type n (n is a natural number)) dynamically scheduled in a system information window (SI-window) designated by the system information block type 1.

Here, each of the master information block message, the system information block type 1 message, and the system information message is a layer-3 message (RRC message). Note that, in this specification, system information (broadcast information) may refer to these RRC messages, or may refer to information (information element) notified with the master information block and each system information block.

The system information message is notified in a radio resource indicated by the physical downlink control channel on the physical downlink shared channel, and carries one piece of system information (system information block type 2 to type n (SIB2 to SIBn (n is a natural number))) classified according to the use, in a corresponding system information window.

As system information, a cell global identifier (CGI), which indicates a cell-specific identifier, a tracking area identifier (TAI) for managing a standby area in paging, random access configuration (common random access configuration) information, timing adjustment information, common radio resource configuration information for each cell, neighboring cell list information on a list of neighboring cells having the same frequency (different frequencies, different RATs), uplink access control information, and the like are notified.

The physical downlink control channel (PDCCH) occupying several OFDM symbols (e.g., one to four OFDM symbols) from the start of each subframe is transmitted. The enhanced physical downlink control channel (EPDCCH) is a physical downlink control channel allocated to the OFDM symbols to which the physical downlink shared channel (PDSCH) is allocated. The PDCCH or EPDCCH is used for notifying each terminal device of radio resource allocation information in accordance with scheduling determined by the base station device and control information indicating an adjustment amount for an increase or decrease in transmit power, or the like. Hereinafter, even when the physical downlink control channel (PDCCH) alone is described, both the physical channels that is, the PDCCH and the EPDCCH, are included unless otherwise noted.

The terminal device needs to monitor the physical downlink control channel addressed to the terminal device itself, and receive the physical downlink control channel addressed to the terminal device itself, before transmitting and receiving a layer-2 message (MAC-CE) and a layer-3 message (paging, system information, or the like), and thereby acquire, from the physical downlink control channel, radio resource allocation information called uplink grant for transmission and downlink grant (also referred to as downlink assignment) for reception. Note that the physical downlink control channel can also be designed to be transmitted in the dedicated resource block region allocated to each terminal device by the base station device, in addition to being transmitted using the above-described OFDM symbols.

The physical downlink shared channel (PDSCH) is also used to notify the terminal device of, in addition to downlink data, a layer-3 message such as paging or system information. Radio resource allocation information on the physical downlink shared channel is indicated (notified) by the physical downlink control channel. The physical downlink shared channel is transmitted being allocated to OFDM symbols other than the OFDM symbols used to transmit the physical downlink control channel. In other words, the physical downlink shared channel and the physical downlink control channel are time division multiplexed in a single subframe.

The broadcast channel BCH is mapped to the physical broadcast channel PBCH. The paging channel PCH and the downlink shared channel DL-SCH are mapped to the physical downlink shared channel PDSCH. The physical downlink control channel PDCCH is used only by the physical channel.

Furthermore, in the downlink, the paging control channel PCCH is mapped to the paging channel PCH. The broadcast control channel BCCH is mapped to the broadcast channel BCH and the downlink shared channel DL-SCH. The common control channel CCCH, the dedicated control channel DCCH, and the dedicated traffic channel DTCH are mapped to the downlink shared channel DL-SCH.

Next, uplink in EUTRA will be described. The uplink logical channel includes a common control channel CCCH, a dedicated control channel DCCH, and a dedicated traffic channel DTCH.

The common control channel CCCH is a logical channel used for transmitting control information between the terminal device and the network, and is used by the terminal device in the uplink when the terminal device has yet to transition to a state in which radio resource control (RRC)

connection has been established with the network (RRC connected state or RRC_CONNECTED), that is RRC idle state or RRC_IDLE.

The dedicated control channel DCCH is a point-to-point bi-directional channel, and is a logical channel used for transmitting dedicated control information between the terminal device and the network. The dedicated control channel DCCH can be used between the terminal device in the RRC connected state and the base station device. The dedicated traffic channel DTCH is a point-to-point bi-directional channel, is a channel dedicated to one terminal device, and is a logical channel used for transferring user information (unicast data).

The uplink transport channel includes an uplink shared channel UL-SCH and a random access channel RACH.

The uplink shared channel UL-SCH supports a hybrid automatic repeat request (HARQ), dynamic link adaptation control, dynamic or semi-static resource allocation, and discontinuous transmission (DTX). On the random access channel RACH, limited control information is transmitted.

The uplink physical channel and physical signal of EUTRA will be described.

A physical uplink control channel (PUCCH) is used for an acknowledgment (acknowledgment/negative acknowledgment; ACK/NACK) in response to reception of downlink data transmitted on the physical downlink shared channel, downlink channel (channel state) information (CSI), or an uplink radio resource allocation request (radio resource request or scheduling request (SR)).

The CSI includes a channel quality indicator (CQI), a precoding matrix indicator (PMI), a precoding type indicator (PTI), and a rank indicator (RI). Each of the indicators may be denoted as "indication."

A physical uplink shared channel (PUSCH) mainly transmits uplink data and uplink control data which may also include control data such as CSI and ACK/NACK. Moreover, the physical uplink shared channel is also used by the terminal device to notify the base station device of uplink control information as a layer-2 message and layer-3 message in addition to uplink data. Radio resource allocation information on the physical uplink shared channel is provided by the physical downlink control channel, as in a case of downlink.

An uplink reference signal (also referred to as "uplink pilot signal" or "uplink pilot channel") includes a demodulation reference signal (MARS) to be used by the base station device to demodulate the physical uplink control channel PUCCH and/or physical uplink shared channel PUSCH, and a sounding reference signal (SRS) to be mainly used by the base station device to estimate an uplink channel state. Moreover, the sounding reference signal includes a periodic sounding reference signal (periodic SRS), which is transmitted periodically, or an aperiodic sounding reference signal (aperiodic SRS), which is transmitted when instructed by the base station device.

A physical random access channel (PRACH) is a channel used for the notification (configuration) of a preamble sequence and includes a guard time. The preamble sequence is constituted of multiple sequences with Which the base station device is notified of information. For example, when 64 sequences are available, 6-bit information can be provided to the base station device. The physical random access channel is used by the terminal device as a means for accessing the base station device.

The terminal device uses the physical random access channel to request an uplink radio resource when no physical uplink control channel is configured or to request the base station device for timing adjustment information (also referred to as timing advance (TA)) necessary for matching uplink transmission timing to a reception timing window of the base station device, for example. Moreover, the base station device can request the terminal device to initiate a random access procedure by using the physical downlink control channel.

In the uplink, the common control channel CCCH, the dedicated control channel DCCH, and the dedicated traffic channel DTCH are mapped to the uplink shared channel UL-SCH.

The uplink shared channel UL-SCH is mapped to the physical uplink shared channel PUSCH. The random access channel RACH is mapped to the physical random access channel PRACH. The physical uplink control channel PUCCH is used only by the physical channel.

Note that, physical channels or physical signals excluding those described above do not strongly relate to each embodiment of the present invention, and therefore detailed descriptions thereof will be omitted. The physical channels or physical signals whose descriptions are omitted include a physical control format indicator channel (PCFICH), a physical hybrid ARQ indicator channel (PHICH), a physical multicast channel (PMCH), and the like.

Furthermore, although, for direct communication between terminal devices (Device to Device or D2D), a logical channel, a transport channel, a physical channel, or a physical signal (also collectively referred to as a sidelink channel) is also used in EUTRA, descriptions thereof will also be omitted.

Protocol Stack

Figure 8:
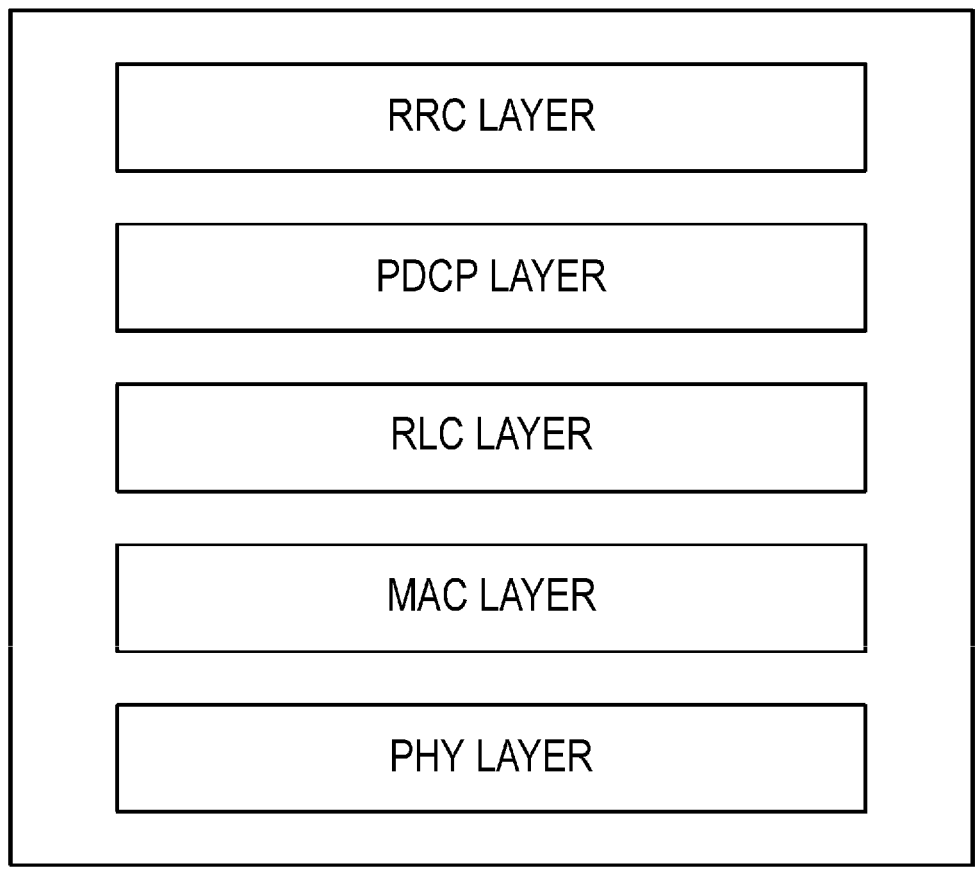
FIG. 8 is a diagram illustrating a protocol stack handling control data in the terminal device and the base station device.
Figure 9:
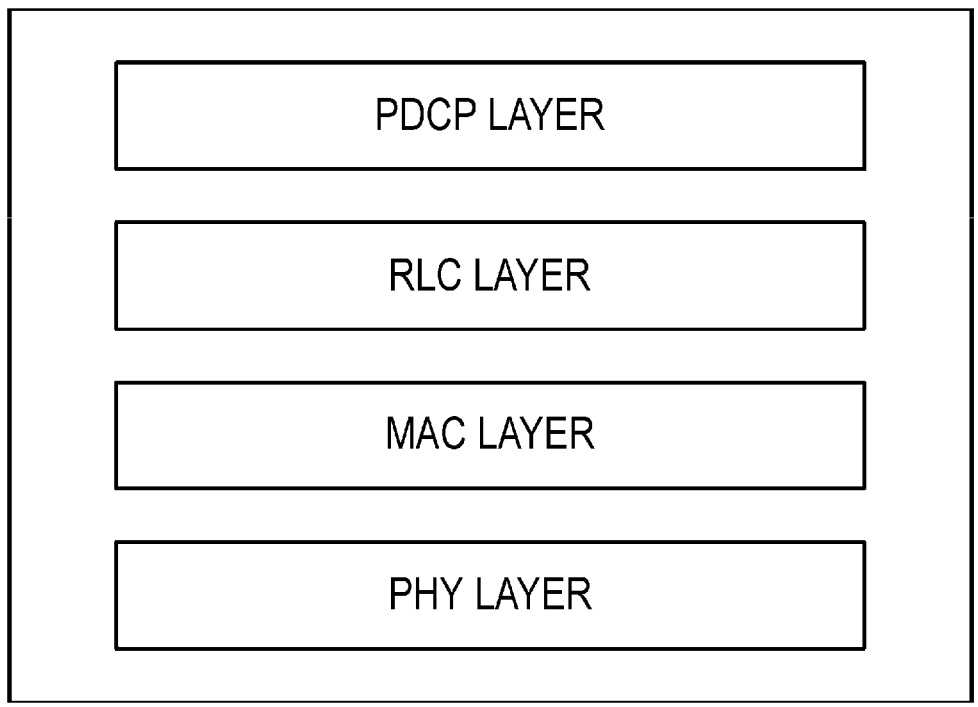
FIG. 9 is a diagram illustrating a protocol stack handling user data in the terminal device and the base station device.

As illustrated in FIG. 8, a protocol stack handling control data of the terminal device and the base station device is classified into at least a physical (PHY) layer, a MAC layer, an RLC layer, a PDCP layer, an RRC layer. Furthermore, as illustrated in FIG. 9, a protocol stack handling user data of the terminal device and the base station device is classified into at least a physical (PHY) layer, a MAC layer, an RLC layer, a PDCP layer. The terminal device and/or the base station device has, in each layer, an entity which executes the function/role of each layer.

The order of the layers in FIG. 8 and FIG. 9 illustrates higher/lower order among the layers. For example, the RRC layer is a higher layer than the PDCP layer, the RLC layer, the MAC layer, and the PHY layer. Furthermore, the MAC layer is a lower layer than the RRC layer, the PDCP layer, and the RLC layer, and is a higher layer than the PHY layer.

The physical layer (PHY layer) provides higher layers with a transfer service using the physical channel. The PHY layer is connected to the medium access control layer (MAC layer) with the transport channel. Data moves between the MAC layer and the PHY layer through the transport channel. Between the physical layers of the terminal device and the base station device, data is transmitted and received through the physical channel.

The MAC layer is connected to the radio link control layer (RLC layer) with the logical channel. The logical channel is classified, depending on a type of information to be transmitted, into a control channel for transmitting control information and a traffic channel for transmitting user information.

The MAC layer has functions of mapping between the logical channel and the transport channel, control of the PHY layer for executing discontinuous reception (DRX) and discontinuous transmission (DTX), notification of transmit power information, HARQ (error correction) control, handling of a priority between the terminal devices by dynamic scheduling, handling of a logical channel priority, transmission format selection, and the like. These functions of the MAC layer are executed by the MAC entity.

The RLC layer has functions of transferring data (protocol data unit: PDU) received from a higher layer, an ARQ (error correction) function, segmentation and concatenation of RLC data, PDU re-segmentation, PDU re-ordering, data duplicate detection, protocol error detection, discard of RLC data, and the like. These functions of the RLC layer are executed by the RLC entity.

The packet data convergence protocol layer (PDCP layer) has functions of transferring user data or control data, header compression for efficiently transmitting IP packets, i.e., user data, in a radio section, management of a sequence number, ciphering and deciphering of user data or control data, integrity protection of control data, data duplicate detection and data discard, and the like. These functions of the PDCP layer are executed by the PDCP entity.

In the radio resource control layer (RRC layer), only control information is defined. The RRC layer has functions of broadcast of system information (including NAS common information, a cell selection parameter, neighboring cell information, common channel configuration, earthquake tsunami warning system (ETWS)/commercial mobile alert system (CMAS)), RRC connection control (paging, establishment/modification/release of RRC connection, integrity protection configuration, ciphering configuration, mobility control, configuration/modification/release of radio bearer (RB), radio configuration control (assignment/modification of ARQ configuration, HARQ configuration, DRY configuration, and the like), addition/modification/release of secondary cell, QoS control, recovery from radio link failure), and the like.

Furthermore, the functions of the RRC layer also include inter-RAT mobility, typical protocol error handling, measurement configuration and report, log storage and report, and the like.

There are two types of RBs: a signaling radio hearer (SRB) and a data radio bearer (DRB). The SRB is used as a path over which the layer-3 message, i.e., control information, is transmitted. The DRB is used as a path over which user information is transmitted. Between the RRC entities of the base station device and the terminal device, each RB (addition, modification, and release) is configured.

The layer-3 message is a message exchanged between the radio resource control (RRC) entities of the terminal device and the base station device and handled in a protocol for a control-plane (C-plane), and may be used as a synonym of RRC signaling or RRC message. A protocol handling user data is referred to as "user-plane (UP or U-plan" in contrast to "control plane."

Random Access Procedure

The random access procedure includes two access procedures: a contention based random access procedure and a non-contention based random access procedure. The MAC entity of the terminal device executes the random access procedure.

The contention based random access procedure is a random access which may cause contention (collision) of resources between the terminal devices. The contention based random access procedure is used for, for example, a scheduling request, in a case of an initial access in a state where the terminal device has no connection (communication) with the base station device, or in a case where uplink data transmission occurs in the terminal device in a state where the terminal device has a connection with the base station device but out of uplink synchronization therewith.

The non-contention based random access procedure is a random access in which contention of resources between the terminal devices does not occur, and is used in a case of a handover, or in a case where transmission timing of the terminal device is not valid. In this random access procedure, the terminal device initiates random access in accordance with an instruction from the base station device.

In the contention based random access procedure, first, the terminal device randomly selects one random access preamble (preamble ID) from a preamble group, transmits the selected preamble to the base station device. The base station device which has received the random access preamble transmits, to the terminal device, a response to the random access preamble (random access response). The terminal device transmits a higher layer message on the basis of scheduling information included in the random access response. The base station device transmits a contention resolution to a terminal device from which the base station device has successfully received the higher layer message.

In the non-contention based random access procedure, first, the base station device notifies each terminal device of a preamble ID (or sequence number) and a random access channel number to be used. The terminal device transmits a random access preamble corresponding to the designated preamble ID. The base station device which has received the random access preamble transmits, to the terminal device, a response to the random access preamble (random access response). Note that, when a value of the preamble ID notified from the base station device indicates "0 (zero)," the terminal device performs the contention based random access procedure.

Upon detecting the random access preamble transmitted from the terminal device, the base station device calculates a shift amount of transmission timing between the terminal device and the base station device from the random access preamble, assigns one temporary cell-radio network temporary identity (Temporary C-RNTI) to the terminal device, maps a random access-radio network temporary identity (RA-RNTI) corresponding to the random access preamble to the physical downlink control channel PDCCH, and transmits a random access response including the transmission timing information, the scheduling information, the Temporary C-RNTI, and the received random access preamble information (preamble ID) using the physical downlink shared channel PDSCH.

Upon detecting the corresponding RA-RNTI from the monitored physical downlink control channel PDCCH, the terminal device receives the corresponding physical downlink shared channel PDSCH (that is, random access response) on the basis of the scheduling information on the PDCCH. When the random access response includes information on the preamble ID transmitted by the terminal device, the terminal device adjusts uplink transmission timing on the basis of the transmission timing information included in the random access response, and transmits a message including information for identifying the terminal device, such as the C-RNTI (or Temporary C-RNTI and contention resolution identity (contention resolution ID)), using a radio resource and a transmission format indicated by the scheduling information of the random access response (also referred to as a message 3).

The base station device receives the message (message 3) transmitted from the terminal device, and transmits, to the terminal device, downlink data using the C-RNTI (or Temporary C-RNTI and contention resolution IL)) included in the received message as a contention resolution for determining whether or not contention (collision) occurs between terminal devices using the C-RNTI (or Temporary C-RNTI and contention resolution identity). Upon successfully receiving the PDCCH including the C-RNTI (or DL-SCH including the contention resolution ID), the terminal device may determine that the contention based random access procedure has succeeded.

Coverage Enhancement

The terminal device (MTCUE) capable of coverage enhancement (supporting coverage enhancement) enhances uplink coverage by performing the multiple number of repetitive transmissions across multiple subframes with respect to a certain transmission to the base station device. Furthermore, the terminal device (MTCUE) capable of the coverage enhancement enhances uplink coverage by performing the multiple number of repetitive receptions across multiple subframes with respect to a certain reception from the base station device.

In other words, in order to compensate for signal attenuation caused by the coverage enhancement, the base station device and the terminal device improve reception quality by combining signals across multiple subframes and receiving the resulting signal.

For example, the base station device may make a notification of the number of repetitions of uplink transmission or the number of repetitions of downlink reception, or the number of repetitions applied to both of the transmissions with system information. Furthermore, when transmitting the random access preamble, the terminal device (MTCUE) may select one of the multiple types of numbers of repetitions of transmission on the basis of either or both of the system information and measurement quality.

Note that, repetition control with respect to the physical downlink control channel PDCCH, the enhanced physical downlink control channel EPDCCH, the physical uplink control channel PUCCH, and the physical random access channel PRACH may be referred to as repetition, and repetition control with respect to the physical downlink shared channel PDSCH and the physical uplink shared channel PUSCH may be referred to as bundling.

When the bundling is configured, a bundle size defines the number of subframes corresponding to one bundle. Bundling operation (process) relies on an HARQ entity for invoking the same HARQ process for each transmission that is part of the same bundle. Within a bundle, HARQ retransmissions are non-adaptive and are triggered without waiting for feedback from previous transmissions depending on the bundle size. The HARQ feedback of a bundle is only received (HARQ-ACK for the PUSCH) or transmitted (HARQ-ACK for the PDSCH) for the last subframe of the bundle by the terminal device. The bundling process is performed in the MAC entity.

The base station device may configure the multiple numbers of repetitions (repetition configurations) corresponding to respective repetition levels or bundling sizes. For example, it may be configured (notified) that the number of repetitions is 8 when the repetition level (bundling size) is 1, the number of repetitions is 16 when the repetition level is 2, and the number of repetitions is 32 when the repetition level is 3. The base station device may configure different values (the numbers of repetitions) on the basis of a size of transmission data. The base station device may configure different values (the numbers of repetitions) for each physical channel. Furthermore, the base station device may configure different values (the numbers of repetitions) for each logical channel or logical channel group. The base station device may notify the terminal device of information on the repetition level or the bundling size, using an individual RRC message.

The broadcast system information is periodically retransmitted. In the transmission of the system information, an HARQ retransmission process is performed in the MAC entity. Repetition control on the reception of the physical downlink control channel PDCCH, the reception of the enhanced physical control channel EPDCCH, the transmission of the physical uplink control channel PUCCH, and the transmission of the physical random access channel PRACH (or random access preamble) is performed in the PHY layer.

Furthermore, a dedicated physical downlink control channel for MTCUE (MPDCCH) may be defined. In this case, the MPDCCH may have a part or all of the role of the PDCCH and/or the EPDCCH to MTCUE.

In light of the above, suitable embodiments of the present invention will be described below in detail with reference to the attached drawings. Note that, in the description of the embodiments of the present invention, when it is determined that a specific description of a known function or constitution associated with the embodiments of the present invention makes the gist of the embodiments of the present invention ambiguous, a detailed description thereof will be omitted.

First Embodiment

A first embodiment of the present invention will be described below.

FIG. 1 is a block diagram illustrating an example of a terminal device 1 according to the first embodiment of the present invention. The present terminal device 1 is constituted of at least a reception unit 101, a demodulation unit 102, a decoding unit 103, a reception data control unit 104, a physical layer control unit 105, a transmission data control unit 106, a coding unit 107, a modulation unit 108, a transmission unit 109, a radio resource control unit 110, a transmit antenna T01, and a receive antenna R01. The "unit" in the drawings, which is expressed as a term such as a section, a circuit, a constituent device, or a device, is an element that realizes the function and each procedure of the terminal device 1.

Note that, hereinafter, the terminal device 1 capable of coverage enhancement (supporting coverage enhancement) may be described simply as the terminal device 1. Furthermore, the terminal device 1 may be classified into two or three types. A first type of terminal device is a terminal classified as one of the existing categories, may be a terminal device dedicated to low cost MTC, or may not be a terminal device dedicated to MTC.

Note that, the conventional categories may be constituted of a combination of downlink categories and uplink categories. For example, for the terminal device 1, a category to which the terminal device 1 belongs may be indicated by a combination of a certain downlink category and a certain uplink category among multiple downlink categories and uplink categories obtained by classification depending on necessary buffer sizes or the like.

A second type of terminal device is a terminal device 1 having a limitation on a system bandwidth supported at least in downlink, in other words, the terminal device 1 supporting a system bandwidth of less than 20 MHz (for example 1.4 MHz). The second type of terminal device may include a terminal device 1 capable of the coverage enhancement of a certain repetition level (bundling size) For example, the terminal device 1 capable of only the coverage enhancement of repetition level 1 may be classified as the second type. The second type of terminal device may be classified as a category (for example, category X) excluding the categories indicated for the first type of terminal device.

Here, "terminal device capable of the coverage enhancement (terminal device supporting coverage enhancement)" refers to the terminal device 1 that is allowed to perform at least a repetitive transmission process and/or a repetitive reception process in accordance with a system, a specification, or a prescribed rule (regulation, configuration (information element)) notified from a base station device 2; however, it does not matter whether or not the coverage is actually enhanced. In other words, the terminal device 1 supports various functions newly added for the repetitive transmission process and/or the repetitive reception process (for example, some or all of the various procedures (functions) such as a measurement procedure, a cell selection procedure, a cell re-selection procedure, a synchronization procedure, a paging procedure, a system information acquisition procedure, an RRC connection procedure, a handover procedure, and a random access procedure).

Likewise, "base station device capable of the coverage enhancement (base station device (cell) supporting the coverage enhancement)" refers to the base station device 2 (cell) that is allowed to perform at least a repetitive transmission process and/or a repetitive reception process in accordance with a system, a specification, or a prescribed rule (regulation, configuration (information element)) determined between an operator or the like and the base station device 2; however, it does not matter whether or not the coverage is actually enhanced. Furthermore, the base station device 2 (cell) supports various functions newly added to the terminal device 1 for the repetitive transmission process and/or the repetitive reception process (for example, some or all of the various procedures (functions) such as the measurement procedure, the cell selection procedure, the cell re-selection procedure, the synchronization procedure, the paging procedure, the system information acquisition procedure, the RRC connection procedure, the handover procedure, and the random access procedure, and the like).

A third type of terminal device is the terminal device 1 supporting the coverage enhancement of all repetition levels (bundling sizes). The third type of terminal device may be classified as a category (for example, category Y) excluding the categories indicated for the first type and second type of terminal devices. In other words, the maximum number of repetitions supported by the second type of terminal device may be less than that supported by the third type of terminal device. Each type may support different functions, and usage thereof may not be limited to MTC (MTC service). In other words, even when this specification describes MTCUE, the usage thereof is not limited to MTC.

The radio resource control unit 110 executes each function of the RRC entity which performs radio resource control of the terminal device 1. Furthermore, the reception data control unit 104 and the transmission data control unit 106 execute respective functions of the MAC entity, the RLC entity, and the PDCP entity in a data link layer (layer 2).

Here, the MAC entity has the function of making notification of the data amount in a transmission buffer corresponding to each logical channel (Buffer Status Report (BSR)), and the function of performing a radio resource request for transmitting uplink data (Scheduling Request). When transmission data is present in a higher layer of the MAC entity and an uplink resource is not allocated to the terminal device 1 (for example, at initial access), the MAC entity executes the random access procedure for the scheduling request Furthermore, when carrier aggregation that allows for communication using multiple cells is performed, the MAC entity controls the physical layer for performing activation/deactivation of a cell and for managing an uplink transmission timing.

Note that, in order to simultaneously/concurrently perform the reception process and the transmission process at multiple frequencies (frequency band, frequency bandwidth) or in the same subframe of a certain cell, the terminal device 1 may include multiple elements of some or all of the reception system blocks (the reception unit 101, the demodulation unit 102, the decoding unit 103, the receive antenna R01), multiple frequencies (frequency band, frequency bandwidth), and transmission system blocks (the coding unit 107, the modulation unit 108, the transmission unit 109, the transmit antenna T01).

As for the reception process in the terminal device 1, from the radio resource control unit 110, reception data control information is input to the reception data control unit 104, and physical layer control information, i.e., a control parameter for controlling each block, is input to the physical layer control unit 105. The physical layer control information includes a parameter configuration that is constituted of reception control information and transmission control information and is necessary for radio communication control of the terminal device 1.

The physical layer control information is configured by a radio resource connection configuration, cell-specific system information, system parameter, or the like that is dedicatedly transmitted from the base station device 2 to the terminal device 1, and is input to the physical layer control unit 105 by the radio resource control unit 110 as necessary. The physical layer control unit 105 suitably inputs the reception control information, i.e., control information relating to the reception, to the reception unit 101, the demodulation unit 102, and the decoding unit 103.

The reception control information may include, as downlink scheduling information, information such as reception frequency band information, reception timing relating to the physical channel and the physical signal, a multiplexing method, radio resource control information, and the like. Furthermore, the reception data control information is downlink control information including secondary cell deactivation timer information, DRX control information, multicast data reception information, downlink re-transmission control information, control information relating to repetitive reception, and the like, and includes control information relating to the downlink in each of the MAC layer, the RLC layer, and the PDCP layer.

A receive signal is received in the reception unit 101 through the receive antenna R01. The reception unit 101 receives a signal from the base station device 2 (or other nodes including the terminal device 1) at the frequency and in the frequency band notified with the reception control information. The received signal is input to the demodulation unit 102. The demodulation unit 102 demodulates the signal. The demodulation unit 102 inputs the demodulated signal to the decoding unit 103.

The decoding unit 103 decodes the input signal, and inputs each piece of decoded data (also referred to as downlink data and downlink control data, a downlink transport block (TB), or a downlink protocol data unit (PDU)) to the reception data control unit 104. Furthermore, a MAC control element (MAC-CE) transmitted from the base station device 2 together with each piece of data is also decoded in the decoding unit 103, and related data is input to the reception data control unit 104.

The reception data control unit 104 performs control of the physical layer control unit 105 (for example, cell activation/deactivation, DRX control, transmission timing adjustment, or the like) based on the received MAC control element, and buffers each piece of decoded data to perform error correction control of retransmitted data (HARQ). Related data among each piece of data input to the reception data control unit 104 is input (transferred) to the radio resource control unit 110.

Furthermore, the reception data control unit 104 adjusts reception timing of the terminal device 1 (frame synchronization, subframe synchronization, symbol synchronization, or the like) from reception timing of a synchronization signal received by the reception unit 101 or the like. The reception timing is managed in the physical layer control unit 105 and is fed back to the reception unit 101 or the transmission unit 109 such that downlink synchronization and/or uplink synchronization is appropriately adjusted.

Furthermore, the reception data control unit 104 may measure reception quality of the downlink reference signal, which is a signal of a known sequence (RSRP, RSSI, RSRQ, or the like), and report the result to the radio resource control unit 110. A measurement period of the reception quality may be configured on the basis of the repetition configuration, or may be notified or broadcast with the RRC message from the base station device 2. The radio resource control unit 110 may determine the number of repetitions of the transmission for the coverage enhancement on the basis of the reported reception quality.

Furthermore, as for the transmission process of the terminal device 1, from the radio resource control unit 110, transmission data control information is input to the transmission data control unit 106, and physical layer control information, i.e., a control parameter for controlling each block, is input to the physical layer control unit 105. The physical layer control unit 105 suitably inputs the transmission control information, i.e., control information relating to the transmission, to the coding unit 107, the modulation unit 108, and the transmission unit 109.

The transmission control information includes, as uplink scheduling information, information such as coding information, modulation information, transmission frequency band information, timing information (or TA) relating to the physical channel and the physical signal, the multiplexing method, radio resource allocation information, and the like.

Furthermore, the transmission data control information is the uplink control information including DTX control information, random access configuration information, uplink shared channel information, logical channel priority information, resource request configuration information, cell group information, uplink re-transmission control information, the buffer status report, control information relating to repetitive transmissions, and the like. The radio resource control unit 110 may configure multiple pieces of random access configuration information individually corresponding to multiple cells in the transmission data control unit 106.

Furthermore, the radio resource control unit 110 manages timing adjustment information and a transmission timing timer used for adjustment of the uplink transmission timing, and manages an uplink transmission timing state (transmission timing adjusted state or transmission timing non-adjusted state) for each cell (or each cell group, each TA group). The timing adjustment information and the transmission timing timer are included in the transmission data control information.

Note that, in a case where multiple uplink transmission timing states need to be managed, the transmission data control unit 106 manages the timing adjustment information corresponding to the uplink transmission timing of each of the multiple cells (or cell group, TA group). The resource request configuration information includes at least maximum transmission counter configuration information and radio resource request prohibition timer information. The radio resource control unit 110 may configure multiple pieces of resource request configuration information individually corresponding to multiple cells in the transmission data control unit 106.

The transmission data occurring in the terminal device 1 (also referred to as uplink data and uplink control data, an uplink transport block (TB), or an uplink protocol data unit (PDU)) is input from the radio resource control unit 110 (or a higher layer unit such as a non-access stratum layer unit (not illustrated)) to the transmission data control unit 106 at a desired timing. Note that, the transmission data is processed, in each layer, by respective units of an RRC PDU, a PDCP PDU, an RLC PDU, and an MAC PDU. At this time, the transmission data control unit 106 calculates the input transmission data amount (uplink buffered amount). Furthermore, the transmission data control unit 106 has the function of determining whether the input transmission data belongs to the control-plane or belongs to the user-plane.

Furthermore, when having the transmission data input thereto, the transmission data control unit 106 stores the transmission data in an uplink buffer (not illustrated) in the transmission data control unit 106. Furthermore, the transmission data control unit 106 performs multiplexing and assembling on the basis of, for example, a priority of the transmission data stored in the uplink buffer to create the MAC PDU. The transmission data control unit 106, then determines whether or not a radio resource necessary for transmission of the input transmission data is allocated to the terminal device 1.

The transmission data control unit 106, on the basis of the radio resource allocation, selects either the radio resource request using the physical uplink shared channel PUSCH and the physical uplink control channel (SR-PUCCH) or the radio resource request using the physical random access channel, and requests, to the physical layer control unit 105, the control process for transmitting the selected channel.

Here, the transmission data control unit 106 creates the buffer status report on the basis of the input transmission data. In other words, the transmission data control unit 106 creates the buffer status report based on the buffered amount of normal transmission data as the MAC control element.

Furthermore, the transmission data control unit 106 may configure the number of repetitions of the transmission of the terminal device itself on the basis of the repetition configuration input from the radio resource control unit 110. The number of repetitions may be configured by the physical channel unit, or the logical channel (logical channel group) unit.

Furthermore, in accordance with the transmission control information, the coding unit 107 suitably codes each piece of data, and inputs the piece of coded data to the modulation unit 108. The modulation unit 108 performs a suitable modulation process on the basis of a channel structure for transmitting each piece of coded data. The transmission unit 109 maps each piece of modulated data to the frequency domain, converts a signal in the frequency domain to a signal in the time domain, and performs power amplification by superimposing the signal on a carrier wave with a prescribed frequency. In accordance with the timing adjustment information on each cell (or each cell group, each TA group) input from the radio resource control unit 110, the transmission unit 109 further adjusts the uplink transmission timing and transmits the signal through the transmit antenna T01.

The physical uplink shared channel to which the uplink control data is allocated can also include the layer-3 message (radio resource control message; RRC message), for example, in addition to the user data.

In FIG. 1, although other constituent elements of the terminal device 1 and other transmission paths of data (control information) between the constituent elements are omitted, it is apparent that the terminal device 1 includes multiple blocks having other functions necessary for operating as the terminal device 1 as constituent elements. For example, in the higher layer of the radio resource control unit 110, a non access stratum (NAS) layer unit which performs control with a core network and an application layer unit are present.

Figure 2:
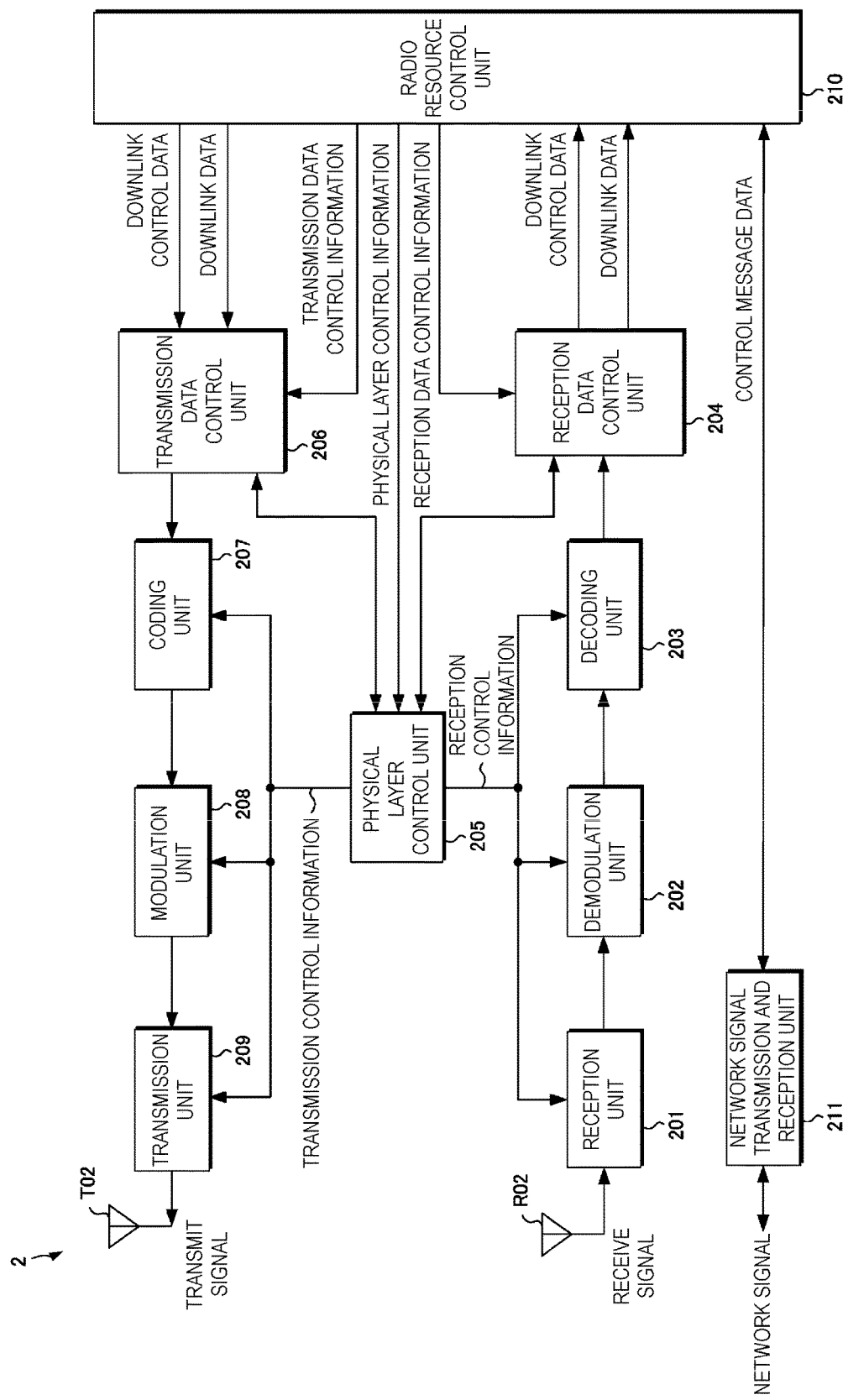
FIG. 2 is a diagram illustrating an example of a constitution of a base station device according to the embodiment of the present invention.

FIG. 2 is a block diagram illustrating an example of the base station device 2 according to the first embodiment of the present invention. The present base station device is constituted of at least a reception unit 201, a demodulation unit 202, a decoding unit 203, a reception data control unit 204, a physical layer control unit 205, a transmission data control unit 206, a coding unit 207, a modulation unit 208, a transmission unit 209, a radio resource control unit 210, a network signal transmission and reception unit 211, a transmit antenna T02, and a receive antenna R02. The "unit" in the drawings, which is expressed also with a term such as a section, a circuit, a constituent device, or a device, is an element that realizes the function and each procedure of the base station device 2.

The radio resource control unit 210 executes each function of the RRC entity which performs the radio resource control of the base station device 2. Furthermore, the reception data control unit 204 and the transmission data control unit 206 execute respective functions of the MAC entity, the RLC entity, and the PDCP entity of the data link layer (layer 2).

Note that, in order to support the transmission and reception processes at multiple frequencies (frequency band, frequency bandwidth) for the carrier aggregation or the like or in the same subframe of the cell, the base station device 2 may include multiple elements of some or all of the reception system blocks (the reception unit 201, the demodulation unit 202, the decoding unit 203, the receive antenna R02), multiple frequencies (frequency band, frequency bandwidth), and the transmission system blocks (the coding unit 207, the modulation unit 208, the transmission unit 209, the transmit antenna R02).

The radio resource control unit 210 inputs downlink data and downlink control data to the transmission data control unit 206. When the MAC control element to be transmitted to the terminal device 1 is present, the transmission data control unit 206 inputs the MAC control element and each piece of data (downlink data or downlink control data) to the coding unit 207.

Furthermore, the transmission data control unit 206 may configure the number of repetitions of the transmission of the base station device itself on the basis of the repetition configuration input from the radio resource control unit 210. The number of repetitions may be configured by the physical channel unit, or the logical channel (logical channel group unit).

Furthermore, the coding unit 207 codes the input MAC control element and each piece of data, and inputs the result to the modulation unit 208. The modulation unit 208 modulates the coded signal. The signal modulated in the modulation unit 208 is input to the transmission unit 209. After mapping the input signal to the frequency domain, the transmission unit 209 converts the signal in the frequency domain to a signal in the time domain, performs power amplification by superimposing the signal on a carrier wave with a prescribed frequency, and transmits the signal through the transmit antenna T02. The physical downlink shared channel to which the downlink control data is allocated typically constitutes the layer-3 message (RRC message).

Furthermore, the reception unit 201 converts the signal received from the terminal device 1 through the receive antenna R02 to a digital signal in a baseband. In a case where cells with multiple different transmission timings are configured for the terminal device 1, the reception unit 201 receives signals at different timings for each cell (or each cell group, each TA group). The digital signal obtained by the conversion in the reception unit 201 is input to and demodulated in the demodulation unit 202. The signal obtained by the demodulation in the demodulation unit 202 is subsequently input to the decoding unit 203.

The decoding unit 203 decodes the input signal, and inputs each piece of decoded data (uplink data and uplink control data) to the reception data control unit 204. Furthermore, the MAC control element transmitted from the terminal device 1 together with each piece of data is also decoded in the decoding unit 203, related data is input to the reception data control unit 204.

The reception data control unit 204 performs control of the physical layer control unit 205 (for example, control relating to a power headroom report, control relating to the buffer status report, or the like) based on the received MAC control element, and buffers each piece of decoded data to perform error correction control of retransmitted data (HARQ). Each piece of data input to the reception data control unit 204 is input (transferred) to the radio resource control unit 210 as necessary.

Furthermore, when the buffer status report from the terminal device 1 is input from the decoding unit 203, the reception data control unit 204 determines either the radio resource request for communication with the base station device itself or the radio resource request for data communication between devices, and configures the radio resource to be allocated to the terminal device 1.

Furthermore, the reception data control unit 204 may measure reception quality of the uplink reference signal and report the result to the radio resource control unit 210. The radio resource control unit 210 may determine the number of repetitions of the transmission of the terminal device 1 for the coverage enhancement on the basis of the reported reception quality.

The physical layer control information necessary for control of each block includes a parameter configuration that is constituted of the reception control information and the transmission control information and is necessary for the radio communication control of the base station device 2. The physical layer control information is configured by a higher network device (MME, gateway device (SGW), OAM, or the like) or with the system parameter, and is input by the radio resource control unit 210 to the control unit 204 as necessary.

The physical layer control unit 205 inputs the physical layer control information associated with the transmission to each of the blocks, that is, the coding unit 207, the modulation unit 208, and the transmission unit 209 as the transmission control information, and suitably inputs the physical layer control information associated with the reception to each of the blocks, that is, the reception unit 201, the demodulation unit 202, and the decoding unit 203 as the reception control information.

The reception data control information includes control information relating to the uplink of the terminal device 1 for each of the MAC layer, the RLC layer, and the PDCP layer of the base station device 2. Furthermore, the transmission data control information includes control information relating to the downlink of the terminal device 1 for each of the MAC layer, the RLC layer, and the PDCP layer of the base station device 2. In other words, the reception data control information and the transmission data control information are configured for each terminal device 1.

Furthermore, the radio resource control unit 210 configures, on the basis of a measurement report message from the terminal device 1 and/or uplink reception quality information from the reception data control unit 204, information on the number of repetitions of the transmission or the reception (the number of repetitive receptions, the number of repetitive transmissions). In other words, the radio resource control unit 210 configures, for each terminal device 1, the number of repetitions of the downlink reception of the terminal device 1 and the number of repetitions of the uplink transmission of the terminal device 1. The number of repetitions may be configured commonly for the uplink and the downlink, may be configured independently for the uplink and the downlink, or may be configured for each physical channel.

The radio resource control unit 210 creates the RRC message including the above-described number of repetitions as an information element, and outputs the message to the reception data control unit 204. Furthermore, the radio resource control unit 210 notifies the physical layer control unit 205 of the number of repetitions of the reception and/or the number of repetitions of the transmission configured for the terminal device 1. The RRC message may be an RRC reconfiguration message, or may be a new RRC message, for example.

The network signal transmission and reception unit 211 transmits (transfers) or receives the control message or the user data between the base station devices 2 or between the higher network device (MME, SGW) and the base station device 2. In FIG. 2, although other constituent elements of the base station device 2 and other transmission paths of data (control information) between the constituent elements are omitted, it is apparent that the base station device 2 includes multiple blocks having other functions necessary for operating as the base station device 2 as constituent elements. For example, a radio resource management unit and an application layer unit are present above the radio resource control unit 210.

A case where the RRC connection establishment procedure is executed when the terminal device 1 changes from the RRC idle state to the RRC connected state will be described.

The terminal device 1 acquires system information from a selected serving cell in the RRC connection establishment procedure, and executes the random access procedure on the basis of a common radio resource configuration included in the acquired system information as an information element.

At this time, some or all of the parameters used by the terminal device 1 for the RRC connection establishment procedure and necessary for the random access procedure may be provided via the common radio resource configuration included in system information (for example, system information block type2, SIB2) for all the terminal devices 1 (that is, the first to third types of terminal devices), may be provided via the common radio resource configuration included in system information (for example, system information block type20, SIB20) for the terminal devices 1 capable of the coverage enhancement (that is, the second and third types of terminal devices), or may be provided being included in both the pieces of system information.

Furthermore, UE timer and constants configuration (hereinafter, referred to as timer/constants configuration) of the terminal device relating to the RRC connection establishment procedure used in the terminal device 1 may be provided (transmitted) being included in first system information and/or second system information.

System information including the common radio resource configuration and the timer/constants configuration as information elements for all the terminal devices 1 is referred to as the first system information. Furthermore, system information including the common radio resource configuration and the timer/constants configuration as information elements for the terminal device 1 capable of the coverage enhancement is referred to as the second system information.

The common radio resource configuration included in the first system information is referred to as a first common radio resource configuration, the common radio resource configuration included in the second system information is referred to as a second common radio resource configuration. The timer/constants configuration included in the first system information is referred to as a first timer/constants configuration, the timer/constants configuration included in the second system information is referred to as a second timer/constants configuration.

Here, the second system information is system information repetitively transmitted at certain short intervals (for example, by subframe unit), and is system information that the terminal device 1 capable of the coverage enhancement can acquire by means of repetitive reception.

When new system information (second system information, for example, the SIB20) is used, the system information may include at least one of the following characteristics: (1) transmitted in a contiguous bandwidth of not more than 6 RB (narrowband);
(2) subjected to bundling (repetition) and transmitted from the base station device 2;
(3) not require the PDCCH or the EPDCCH (not being scheduled with PDCCH or EPDCCH);
(4) scheduled via the PDCCH or the EPDCCH allocated to a different region (search space);
(5) scheduled with the PDCCH or EPDCCH in a narrowband;
(6) having a modulation and coding scheme designated with other system information (for example, MIB/SIB1) or system parameters;
(7) having a longer modification period than before;
(8) able to be used only in the second and third types of terminal devices; and
(9) considered as essential system information in the second and third types of terminal devices.

The terminal device 1, which is not capable of the coverage enhancement, may perform the random access by using a random access parameter (first parameter) included in the first common radio resource configuration, and the terminal device 1, which is capable of the coverage enhancement, may perform the random access by using a new random access parameter (second parameter) relating to the coverage enhancement included in the second common radio resource configuration.

At this time, multiple sets of random access parameters corresponding to the number of repetitions (repetition level or bundling size) may be included in the second common radio resource configuration, or some of the random access parameters may be included in the second common radio resource configuration. For example, the base station device 2 (cell) supporting one to three times as the number of repetitions transmits a set of three types of parameters (random access parameters) relating to the random access with the parameters included in the common second radio resource configuration.

The terminal device 1 may perform random access resource selection on the basis of the random access parameter corresponding to the number of repetitions. In other words, the number of repetitions (or repetition level) and a random access resource in the coverage enhanced cell may be mapped on one-to-one basis. Here, the random access resource selected by the terminal device 1 includes at least the random access preamble group, the subframe for transmitting the random access preamble, and the frequency resource allocation of the uplink and a frequency hopping pattern may further be selected as the random access resource.

When multiple sets of the random access parameters are configured for the second common radio resource configuration, the terminal device 1 may select one corresponding parameter (parameter set) on the basis of the measurement result (RSRP and/or RSRQ) on the cell. In other words, the terminal device 1 may determine the number of repetitions (repetition level) on the basis of the measurement result on the cell and perform random access resource selection on the basis of the parameter (or parameter set) corresponding to the number of repetitions (repetition level).

Furthermore, the terminal device 1 may select a corresponding parameter (parameter set) on the basis of UE capability. The UE capability of the terminal device 1 to be considered here includes, for example, capability information on the physical layer such as the maximum number of repetitions supported by the terminal device 1, capability information relating to types (first to third types) of the terminal device 1, other capability information indicating whether or not the terminal device 1 supports mobility (that is, a procedure involving a cell change such as cell reselection or a handover) (or whether or not the terminal device 1 is a movable terminal device), and the like.

A condition required for the measurement of the terminal device 1 capable of the coverage enhancement may be relaxed in comparison with a condition required for the measurement of the normal terminal device 1 (also referred to as normal coverage UE).

Furthermore, multiple UE timers (also referred to as an RRC timer) individually corresponding to the numbers of repetitions (or repetition levels) and/or constant configuration may be included in the second timer/constants configuration. In other words, a cell supporting one to three times as the number of repetitions has three sets of UE timers and/or constant configurations.

The UE timers included in the second timer/constants configuration are, for example, T300, T301, T310, and T311. Furthermore, constants included in the second timer/constants configuration are, for example, N310 and N311. The T300 is a timer used in the RRC connection establishment procedure, the T301 is a timer used in an RRC connection re-establishment procedure, the T310 is a timer used in radio link failure detection, and the T311 is a timer used in cell search after the radio link failure detection. The N310 is a constant that is a synchronization primitive and indicates the maximum count number of in-sync indication, the T311 is a constant that is a synchronization primitive and indicates the maximum count number of out-of-sync indication.

Figure 3:
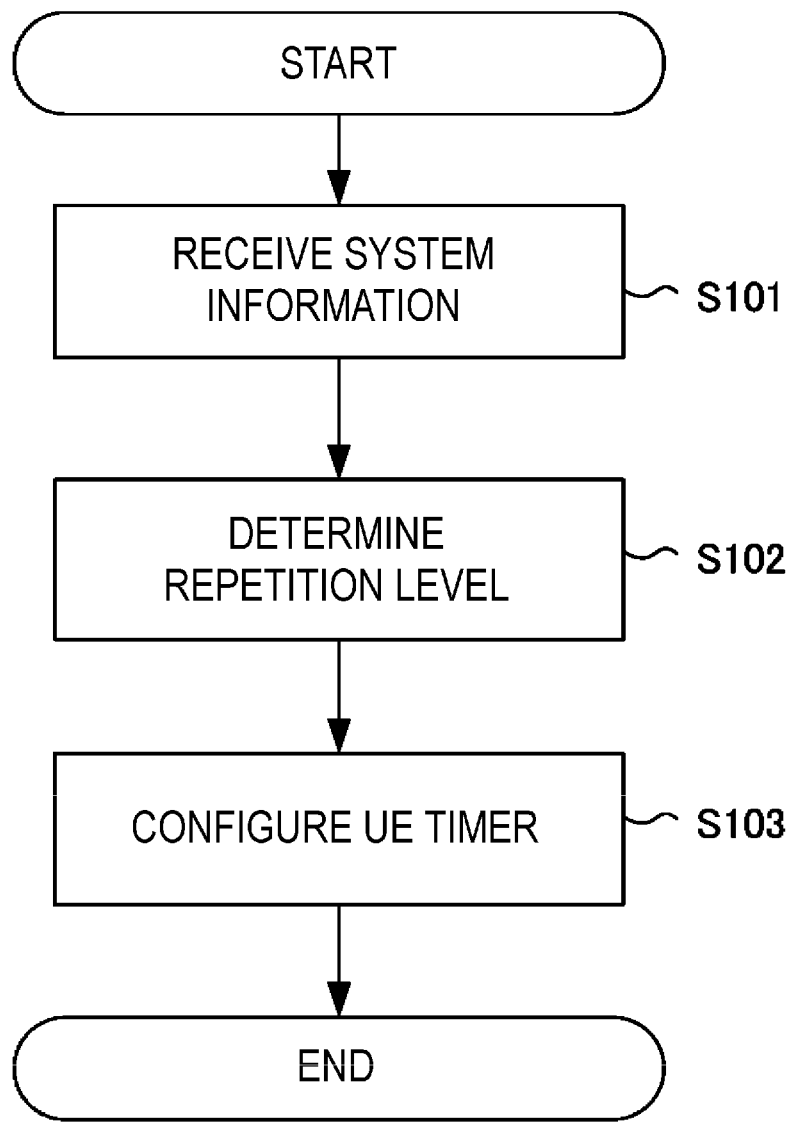
FIG. 3 is a flowchart diagram illustrating an example of a selection process of a UE timer in a terminal device according to a first embodiment of the present invention.

FIG. 3 is a flowchart diagram for explaining an example of a UE timer selection process in the RRC connection establishment procedure of the terminal device 1 capable of the coverage enhancement.

The base station device 2 repetitively transmits the second system information on the cell where the coverage enhancement is performed. Furthermore, the base station device 2 transmits the second system information that includes at least the second common radio resource configuration and the second timer/constants configuration. Note that, the second system information may also be considered as a TBMAC PDU including the BCCH (BCH or SIB) corresponding to the second system information.

For example, the base station device 2 performs repetitive (bundling) transmissions of a certain number of repetitions (for example, 30 times) of the second system information. Alternatively, the base station device 2 performs repetitive transmissions of the second system information.

The terminal device 1 attempts the reception (acquisition) of the second system information repetitively transmitted on the cell in step S101. In other words, the terminal device 1 attempts acquisition of the second system information by repeating the reception process for the second system information. At this time, the terminal device 1 acquires at least the second common radio resource configuration and the second timer/constants configuration from the received second system information.

Subsequently, the terminal device 1 determines the repetition level in step S102. The repetition level in the terminal device 1 can be determined (selected) by using any of: (1) a common repetition level indicated by the second system information;
(2) a repetition level determined in the random access resource selection on the basis of the measurement result;
(3) a repetition level determined on the basis of the capability information on the terminal device 1; and
(4) a repetition level notified (allocated) from the base station device 2 during the random access procedure.

Note that, the base station device 2 can transmit the maximum value of the repetition level, which is applicable to the terminal device 1 on the cell, included in the system information for each cell. Furthermore, when the maximum value of the repetition level is not designated, the terminal device 1 may use a default value or the maximum value of the repetition level supported by the terminal device 1 as the maximum value of the repetition level of the cell.

Note that, when the base station device 2 makes notification (configuration, indication) of the repetition level during the random access procedure (in the case of (4) described above), at least the repetition level applied to the transmission of the random access preamble needs to be determined (selected) by the terminal device 1. The terminal device 1 applies the repetition level indicated by the base station device 2 to the transmission and the reception after the message 3. Note that, any method of (1) to (3) described above can be used for the determination method of the repetition level in the terminal device 1.

The repetition level indicated by the base station device 2 may be notified with the MAC control element in the random access response, may be indicated by the random access response (DL-SCH), or may be indicated by the physical layer downlink control information notified on the PDCCH or the EPDCCH. Alternatively, the repetition level may be implicitly notified by the subframe number and/or the frequency resource in which the random access response is transmitted. The repetition level may be separately configured for the uplink and the downlink. Furthermore, the repetition level may be notified with the MAC control element in the contention resolution, or indicated by the contention resolution (DL-SCH).

When the random access resource used for the detected random access preamble is a resource relating to the coverage enhancement on the cell, the base station device 2 may determine a transmission frequency of the random access response and/or the number of transmissions (repetition level) of the random access response on the basis of the random access resource.

In other words, the base station device 2 may determine a transmission resource of the random access response on the basis of the random access preamble transmitted from the terminal device 1 and/or the frequency with which the random access preamble is received. The base station device 2 may not transmit the PDCCH or the EPDCCH for scheduling the random access response. The terminal device 1 may directly monitor the random access response without monitoring the PDCCH or the EPDCCH. The terminal device 1 may determine the transmission frequency of the random access response and/or the repetition level of the random access response on the basis of the selected random access resource, and may monitor the random access response.

Subsequently, the terminal device 1 configures the timer (UE timer) used for the RRC connection establishment procedure (step S103). The terminal device 1 uses the timer T300 as the UE timer for the RRC connection establishment procedure. The timer T300 may use a value indicated by the second timer/constants configuration included in the second system information (A1); may be configured on the basis of the repetition level determined in step S102 (B1); or may be configured as a value obtained by totaling configuration values of a reference time (T300reference) and an offset time (T300offset). Hereinafter, the UE timer used for the RRC connection establishment procedure on the coverage enhanced cell, in order to distinguish from the conventional timer T300, is referred to as a timer T308 (also referred to as a timer T300bis).

In other words, the base station device 2 may indicate, to the terminal device 1, a value of the timer T308 by the second timer/constants configuration included in the second system information; may notify the terminal device 1 of values of multiple timers T308 based on the repetition level (B2); and may notify the terminal device 1 of the reference time (T308reference) and the offset time (T308offset) for calculating the timer T308 (C2).

In (A1/A2) described above, it is preferable that a value of the timer included in the second system information be configurable such that the maximum time is longer than the value of the first timer/constants configuration. For example, when as the timer T300 (first timer) notified with the first timer/constants configuration, any value of 100 ms, 200 ms, 300 ms, 400 ms, 500 ms, 600 ms, 1000 ms, and 2000 ms can be configured, it is preferable that, as the timer T308 (second timer) notified with the second timer/constants configuration, any value of 500 ms, 1000 ms, 2000 ms, 3000 ms, 5000 ms, 10000 ms, 15000 ms, and 20000 ms be configurable.

Alternatively, in (A1/A2) described above, the value of the second timer/constants configuration included in the second system information may be a value in a different range from the value of the first timer/constants configuration included in the first system information, and furthermore may always exceed a value range configurable for the first timer/constants configuration. For example, when as the timer T300 (first timer) notified with the first timer/constants configuration, any value of 100 ms, 200 ms, 300 ms, 400 ms, 500 ms, 600 ms, 1000 ms, and 2000 ms can be configured, it is preferable that, as the timer T308 (second timer) notified with the second timer/constants configuration, any value of 3000 ms, 4000 ms, 5000 ms, 6000 ms, 10000 ms, 15000 ms, 20000 ms, and 30000 ms be configurable.

Furthermore, in (B1/B2) described above, for a cell in which the repetition levels 1 to 3 are selected, three different values of the timer T308 (second timer) individually corresponding to the repetition levels may be prepared (transmitted). For example, when the repetition level is 1, the terminal device 1 may select the timer T308 corresponding to the repetition level 1 from the second timer/constants configuration and use the timer T308. The base station device 2 may transmit, to the terminal device 1, the second timer included in the second system information, or may transmit with a dedicated RRC message.

Furthermore, in (C1/C2) described above, the offset time (T308off) may be configured on the basis of the repetition level determined in step S102. In other words, for a cell in which the repetition levels 1 to 3 are selected, three different values of the offset time individually corresponding to the repetition levels may be prepared (transmitted). For example, when the repetition level is 1, the terminal device 1 may select the offset time (T308offset-lv1) corresponding to the repetition level 1 from the second timer/constants configuration and use the offset time.

Alternatively, in (C1/C2) described above, the offset time (T308offset) may be calculated using a multiple (coefficient) based on the repetition level determined in step S102. In other words, for a cell in which the repetition levels 1 to 3 are selected, three different multiples individually corresponding to the repetition levels are prepared (transmitted), the terminal device 1 may multiply the multiple selected on the basis of the repetition level by the reference time (T308reference) to calculate the UE timer.

For example, when the reference time (T308reference) is 500 ms and the repetition level is 1, the terminal device 1 selects the multiple corresponding to the repetition level 1 from the second timer/constants configuration (for example, 2), calculates the timer T308 from the reference time and the corresponding multiple, and uses the timer T308. In the present example, the value of the tinier T308 is 500*2=1000 ms. Alternatively, the repetition level may indicate the multiple as it is. Furthermore, the base station device 2 may configure a different value for each cell as the reference time.

The base station device 2 may transmit, to the terminal device 1, the reference time and the offset time (or multiple) included in the second system information, or may transmit using the dedicated RRC message.

When the timer T308 (second timer)) acquired from the second system information is used as in (A1/A2) described above, the terminal device 1 may create an RRC connection request message in the RRC connection establishment procedure and provide (submit) the message to the lower layer after starting the timer T308.

On the other hand, when the timer T308 (second timer) based on the repetition level is used as in (B1/B2) and (C1/C2) described above, the random access procedure is initiated after the RRC connection request message is provided (submitted) from the RRC entity of the terminal device 1 to the lower layer (for example, PDCP entity or RLC entity) of the terminal device 1. Therefore, the terminal device 1 (RRC entity), after receiving the information (indication) relating to the repetition level from the lower layer, needs to start the timer T308 based on the received repetition level. This will be described with reference to FIG. 4 and FIG. 5.

Figure 4:
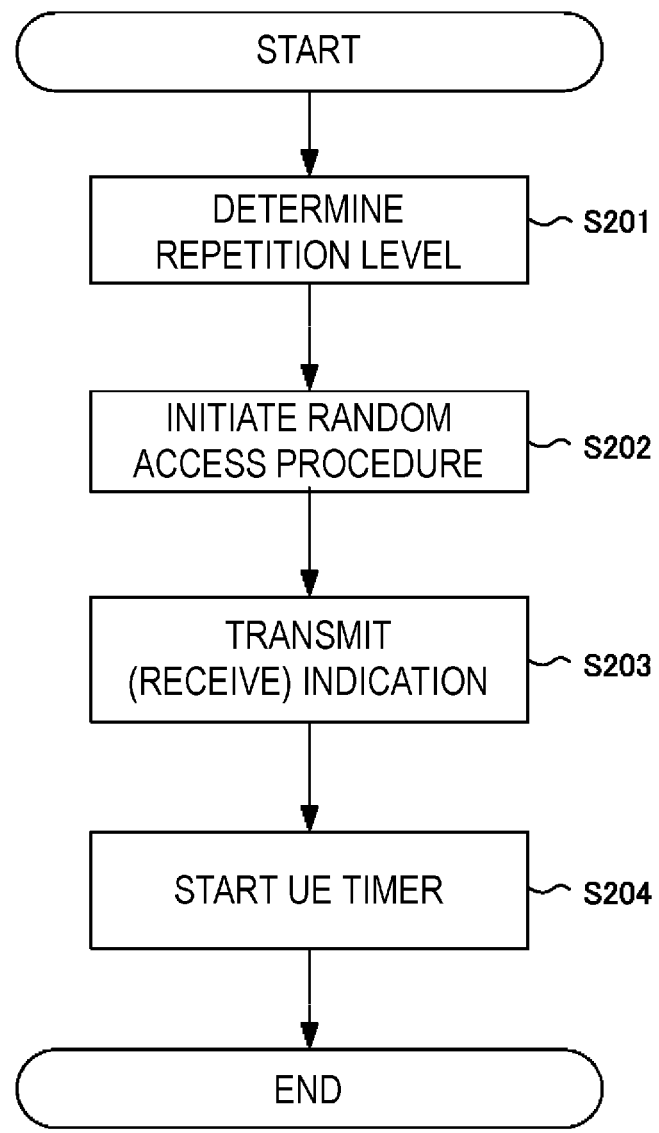
FIG. 4 is a flowchart diagram illustrating an example of a start process of the UE timer in the terminal device according to the first embodiment of the present invention.

FIG. 4 is a flowchart diagram for explaining an example of a timer start process in the RRC connection establishment procedure of the terminal device 1 capable of the coverage enhancement. FIG. 4 illustrates an example of a case where an indication is transmitted to the higher layer of the terminal device 1 (for example, RRC entity) when the MAC entity of the terminal device 1 initiates the random access procedure.

In FIG. 4, the terminal device 1 determines the repetition level before initiating the random access procedure for the cell capable of the coverage enhancement. As for a determination method of the repetition level, any of the methods in step S102 may be used. The terminal device 1 (RRC entity) provides (submits) the RRC connection request message to the lower layer. The MAC entity of the terminal device 1 initiates the random access procedure in order to transmit the RRC connection request message (step S202). The MAC entity of the terminal device 1 during the random access procedure transmits the indication indicating the repetition level to the higher/upper layer (for example, RRC entity) of the terminal device 1 (step S203).

For example, when the terminal device 1 selects the (temporary) repetition level for transmitting the random access preamble, the MAC entity of the terminal device 1 transmits the indication to the higher layer of the terminal device 1. Furthermore, for example, when the repetition level is notified (indicated) from the base station device 2 during the random access procedure, the MAC entity of the terminal device 1 transmits the indication to the higher layer of the terminal device 1. Here, the indication includes at least the repetition level of the terminal device 1 on the cell or information indicating the repetition level.

In other words, in step S203, the terminal device 1 (RRC entity) receives the indication including the repetition level information from the lower layer when initiating the random access procedure (when performing the random access resource selection) or during the random access procedure.

The terminal device 1 (RRC entity) which has received the indication determines the value of the timer T308 as the timer (UE timer) relating to the RRC connection establishment procedure on the basis of the repetition level, and starts the operation of the timer T308 (step S204).

Figure 5:
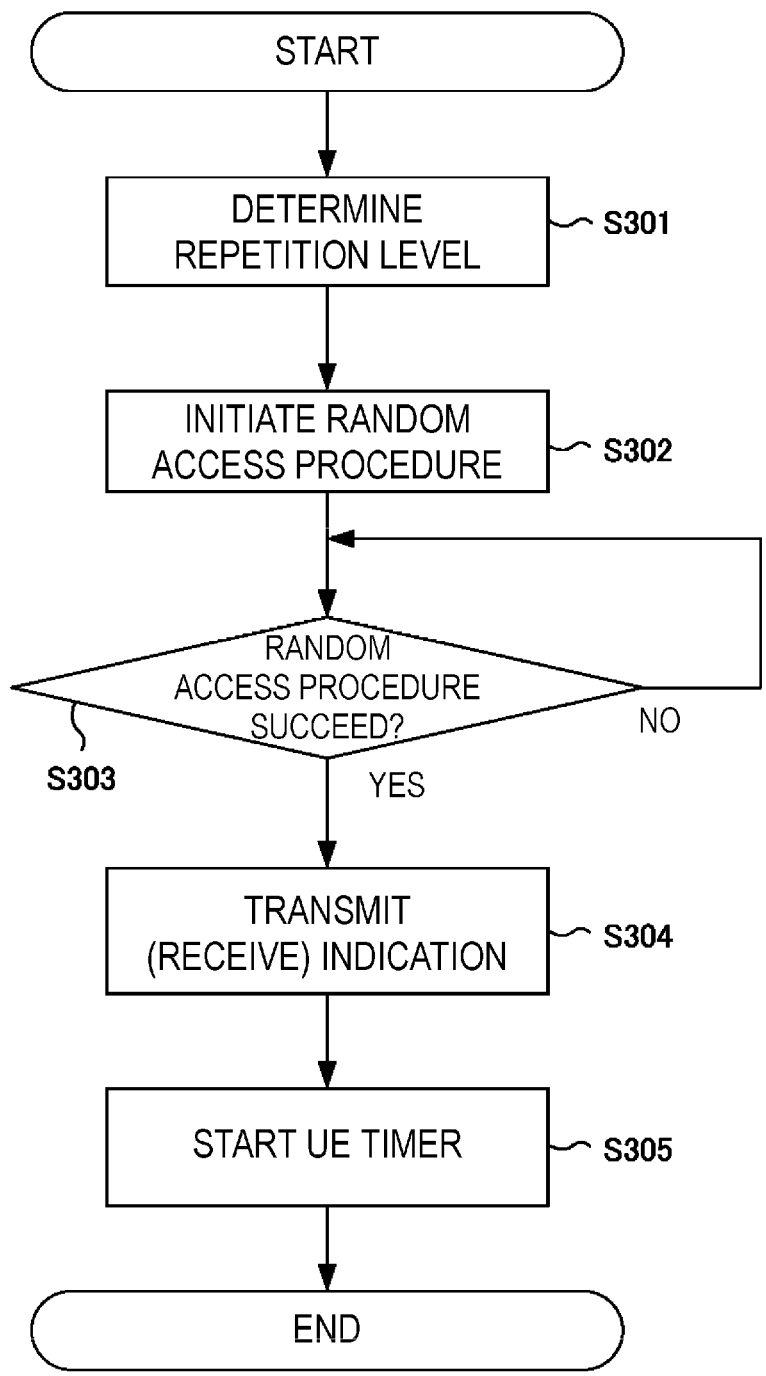
FIG. 5 is a flowchart diagram illustrating another example of the start process of the UE timer in the terminal device according to the first embodiment of the present invention.

FIG. 5 is a flowchart diagram for explaining another example of the UE timer start process in the RRC connection establishment procedure of the terminal device 1 capable of the coverage enhancement. Step S301 and step S302 in FIG. 5 have the same operations as those in step S201 and step S202 in FIG. 4, respectively, and thus descriptions thereof will be omitted.

In step S303, the MAC entity of the terminal device 1 determines whether or not the random access procedure has succeeded. When the random access procedure has succeeded (Yes in step S303), the MAC entity of the terminal device 1 transmits the indication indicating the repetition level to the higher/upper layer (for example, RRC entity) of the terminal device 1 (step S304). On the other hand, when the random access procedure has yet to succeed (No in step S303), the MAC entity of the terminal device 1 repeats the process until the random access procedure succeeds.

In other words, in step S304, the terminal device 1 (RRC entity) receives, from the lower layer, the indication including the repetition level information when the random access procedure has succeeded.

Note that, in order to prevent deadlock when the lower layer does not notify the terminal device 1 of the indication, the terminal device 1 (RRC entity) may start another UE timer acquired from the second system information or the MAC timer in step S302. When the UE timer (hereinafter, referred to as T309) is used, after the RRC connection request message is created or when the RRC connection request message is provided (submitted) to the lower layer, the T309 is started. When the MAC timer (hereinafter, referred to as a CE-RACH timer) is used, the CE-RACH timer is started from an initial transmission subframe of the random access preamble.

When the timer T309 has expired, the terminal device 1 (RRC entity) may determine that the RRC connection establishment procedure fails. Furthermore, when receiving the indication from the lower layer (step S304 in FIG. 5), the terminal device 1 (RRC entity) may stop the timer T309 and start the timer T308.

Furthermore, when the CE-RACH timer has expired, the terminal device 1 (MAC entity) may determine that the random access procedure fails. Furthermore, when the random access procedure has succeeded, the terminal device 1 (MAC entity) may stop the CE-RACH timer (step S303 in FIG. 5).

The terminal device 1 (RRC entity) which has received the indication from the lower layer determines the timer T308 as the timer (UE timer) relating to the RRC connection establishment procedure on the basis of the indicated repetition level, and starts the operation of the timer T308 (step S305 in FIG. 5). Furthermore, when the timer T308 has expired, the terminal device 1 (RRC entity) may determine that the RRC connection establishment procedure fails.

Figure 6:
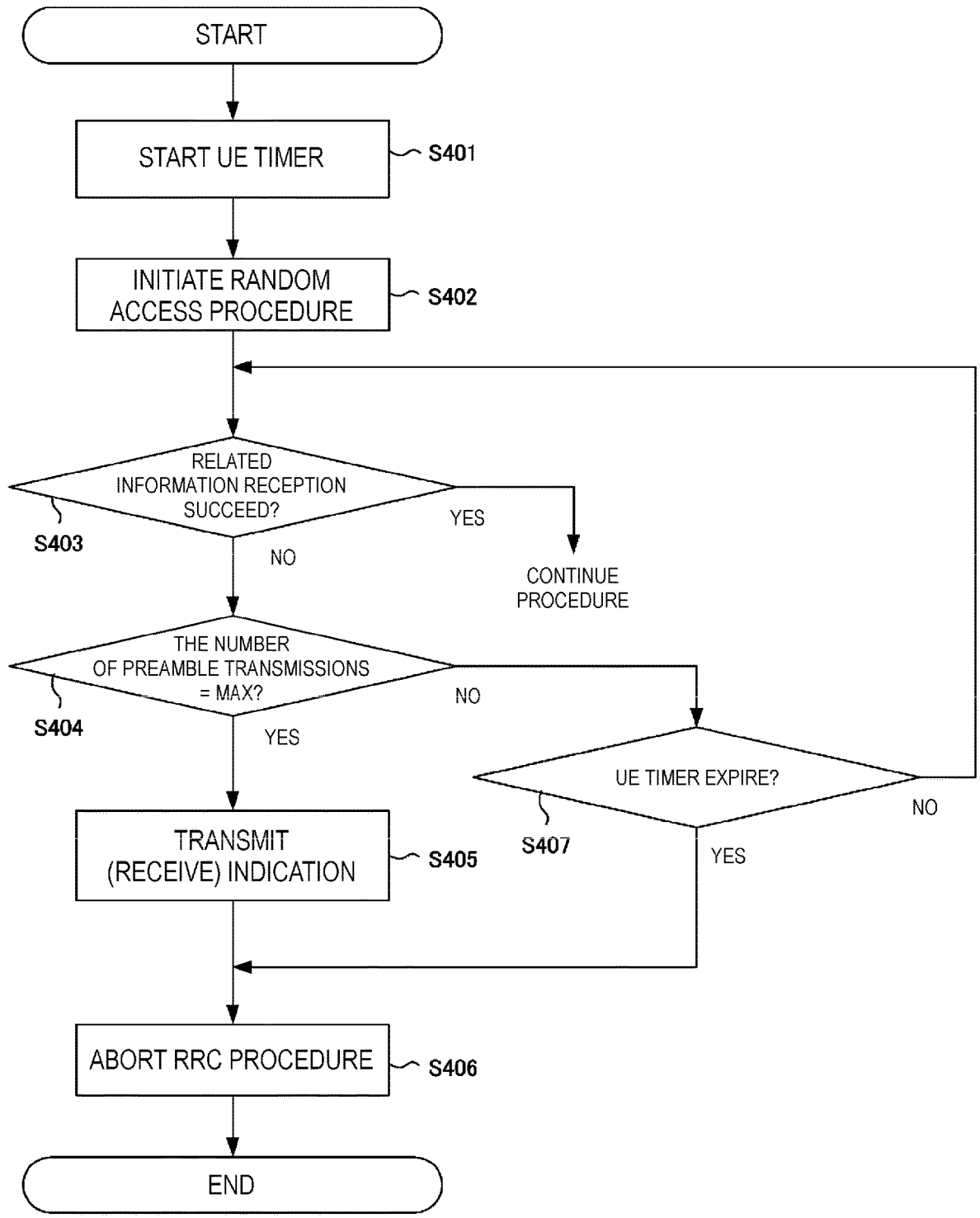
FIG. 6 is a flowchart diagram illustrating an example of an abort process of an RRC procedure in the terminal device according to the first embodiment of the present invention.

Although FIGS. 4 and 5 illustrate an example of a case where different UE timers are configured on the basis of the repetition level of the terminal device 1, as in (A1/A2) described above, by configuring the UE timer for long period compliant with the coverage enhancement, start timing of the UE timer may be set in the same manner as in the conventional terminal device 1. However, the timer value in this case is not determined (configured) corresponding to the repetition level of the terminal device 1, time until the UE timer expires may increase more than necessary. FIG. 6 is a diagram for explaining a method in which the terminal device 1 capable of the coverage enhancement aborts (halts) the RRC procedure, as for this increase in time until expiration.

In FIG. 6, the terminal device 1 starts the UE timer (step S401). At this time, the terminal device 1 may start the timer T308 relating to the RRC connection establishment procedure acquired from the second timer/constants configuration included in the second system information.

Subsequently, the MAC entity of the terminal device 1 initiates the random access procedure as one procedure in the RRC connection establishment procedure (step S402). The MAC entity of the terminal device 1 monitors a response to the transmission data relating to the random access transmitted most recently in step S403.

In other words, when the transmission data that the terminal device 1 has transmitted most recently is the random access preamble, the MAC entity of the terminal device 1 monitors the random access response in step S403. When the received random access response includes a corresponding random access preamble ID (Yes in step S403), the MAC entity of the terminal device considers (determines, deems) that the reception of the random access response has succeeded, and moves to the subsequent procedure (not illustrated).

Note that, the terminal device 1 considers that the reception of the random access response has failed when, after transmitting the random access preamble, the terminal device 1 has not received the random access response within the random access response window or the terminal device 1 has not received the random access response including the random access preamble ID corresponding to the transmitted random access preamble (No in step S403).

Alternatively, in a case where the transmission data that the terminal device 1 has transmitted most recently is transmission data based on the scheduling information included in the random access response, the MAC entity of the terminal device 1 performs a contention resolution in step S403. In a case where the received downlink data includes the C-RNTI of the terminal device 1 or the transmitted contention resolution ID (Yes in step S403), the MAC entity of the terminal device considers (determines, deems) that the contention resolution has succeeded, and proceeds to the subsequent procedure (not illustrated).

Note that, when, after transmitting the transmission data based on the scheduling information included in the random access response, the contention resolution has not succeeded before expiration of the timer relating to the contention resolution (mac-ContentionResolutionTimer) (No in step S403), the terminal device 1 considers that the contention resolution has failed.

When the reception of the random access response has failed or the contention resolution has failed, the MAC entity of the terminal device 1 increments a preamble transmission counter by one if power ramping suspension has not been notified from the lower layer. The terminal device 1 confirms whether or not the value of the incremented preamble transmission counter (that is, the number of the preamble transmissions) has reached the maximum value (=preambleTransMax+1) (step S404).

When the number of the preamble transmissions reaches the maximum value (Yes in step S404), the MAC entity of the terminal device 1 transmits the indication (random access problem indication) indicating that a random access problem occurs to the higher layer in step S405. At this time, when the repetition level has not reached the maximum repetition level value (the maximum value of the repetition level) supported by the cell, the terminal device 1 (MAC entity) may select the random access resource in the next repetition level and execute the random access procedure. The maximum repetition level may be configured by the second system information for each cell.

In other words, the terminal device 1 (RRC entity) receives the indication (information) indicating that the random access problem occurs from the lower layer. At this time, the terminal device 1 (RRC entity) aborts the RRC procedure (RRC connection establishment procedure) which is being executed (step S406).

When the number of the preamble transmissions has not yet reached the maximum value (No in step S404), the MAC entity of the terminal device 1 determines whether or not the UE timer (T308) has expired in step S407. When the UE timer has not yet expired (No in step S407), the terminal device 1 continues the random access procedure which is being executed. On the other hand, when the UE timer has not yet expired (Yes in step S407), the terminal device 1 may abort the RRC procedure (in the present example, RRC connection establishment procedure) which is being executed (step S406).

Note that, when receiving, from the lower layer, the indication indicating the occurrence of the random access problem on the normal cell while the first timer (T300) is in operation, the terminal device 1 (RRC entity) may ignore the received indication and continue the RRC procedure (that is, RRC connection establishment procedure). On the other hand, when receiving, from the lower layer, the indication indicating the occurrence of the random access problem on the coverage enhanced cell while the second timer (T308) is in operation, the terminal device 1 (RRC entity) may abort the RRC procedure (in the present example, RRC connection establishment procedure) which is being executed.

Furthermore, the terminal device 1 (RRC entity) counts the number of times of notification of the indication transmitted from the lower layer, and when the number of times of notification of the indication has reached a certain threshold value, the terminal device 1 may abort the RRC procedure (RRC connection establishment procedure) which is being executed. The threshold value may be configured as a parameter of the random access configuration information included in the second system information.

Alternatively, the MAC entity of the terminal device 1 may transmit an indication indicating the repetition level to the higher layer in step S405. In other words, when receiving the indication (information) indicating the repetition level from the lower layer while the second timer (T308) is in operation, the terminal device 1 (RRC entity) may abort the RRC procedure (RRC connection establishment procedure) which is being executed.

Alternatively, the MAC entity of the terminal device 1 may transmit, to the higher layer, an indication indicating that the repetition level has reached the maximum repetition level supported by the cell in step S405. In other words, when receiving, from the lower layer, the indication (information) indicating that the repetition level has reached the maximum repetition level supported by the cell while the second timer (T308) is in operation, the terminal device 1 (RRC entity) may abort the RRC procedure (RRC connection establishment procedure) which is being executed.

Furthermore, the terminal device 1 may initiate the RRC procedure without starting the timer (UE timer) relating to the RRC procedure. In this case, the terminal device 1 (RRC entity) may abort the RRC procedure (RRC connection establishment procedure) which is being executed on the basis of the indication transmitted from the lower layer.

Although the RRC connection establishment procedure has been mainly described, the same method can also be applied to the RRC connection re-establishment procedure which is executed, after the terminal device 1 detects the radio link failure (RLF), to return from the RLF. Although, in the RRC connection re-establishment procedure, the terminal device 1 is different in that the T301 is used as the UE timer instead of the T300, the same method as in the RRC connection establishment procedure can be applied to other many procedures such as a determination (configuration) method of the UE timer, and a starting method of the UE timer, for example.

In such a constitution, when the terminal device 1 supports the coverage enhancement, the terminal device 1 can suitably configure the UE timer used for the RRC procedure executed by the terminal device 1 capable of the coverage enhancement, by using the information transmitted with the system information from the base station device 2 (cell) supporting the coverage enhancement. Furthermore, the base station device 2 can transmit the UE timer relating to the RRC procedure used by the terminal device 1 supporting the coverage enhancement with the system information.

Furthermore, the terminal device 1 can select and use one suitable UE timer from among the multiple UE timers individually corresponding to the repetition levels. Furthermore, the terminal device 1 can start the UE timer at suitable timing on the basis of the indication relating to the random access procedure transmitted from the lower layer. Furthermore, the base station device 2 can provide the multiple UE timers corresponding to the repetition levels with the system information on the coverage enhanced cell.

This enables the base station device 2 and the terminal device 1 to execute the RRC procedure using the suitable UE timer, and thus the efficient radio resource control procedure can be realized.

Second Embodiment

A second embodiment of the present invention will be described below.

In the first embodiment, time (the number of repetitions) necessary for the random access on the coverage enhanced cell is different depending on the repetition levels, which requires that the timer (UE timer) relating to the RRC procedure be changed taking the repetition level into consideration. In the second embodiment, the UE timer configuration method based on a different random access procedure will be described.

For a handover procedure (RRC connection reconfiguration procedure) which is one of the RRC procedures, either the contention based random access procedure or the non-contention based random access procedure is used. The handover procedure is an RRC procedure used for changing a primary cell of the terminal device 1.

When causing (indicating) the terminal device 1 to perform the handover, the base station device 2 transmits an RRC connection reconfiguration message including mobility control information (MobilityControlInfo). When the RRC connection reconfiguration message received from the base station device 2 includes the mobility control information, the terminal device 1 initiates the handover procedure on the basis of the information of the message.

The mobility control information includes at least a physical cell ID of the cell (target cell) indicated as a handover destination, the common radio resource configuration information on the target cell, the C-RNTI, and the UE timer (timer T304), and includes, as an option configuration, downlink frequency information and bandwidth information on the target cell, and dedicated random access channel configuration information (dedicated RACH configuration (RACH-ConfigDedicated)). The dedicated random access channel configuration information may include a random access preamble (preamble ID) information transmitted on the target cell, transmission subframe information on the random access transmitted on the target cell.

Furthermore, the base station device 2 may include information indicating whether or not the target cell is the coverage enhanced cell in the mobility control information. The base station device 2 may include information on the UE timer (hereinafter, referred to as a timer T304bis) used for the handover procedure on the coverage enhanced cell in the mobility control information. Furthermore, the base station device 2 may include the repetition level (or information indicating the repetition level) applied to the random access preamble on the target cell in the mobility control information. The base station device 2 may include the maximum value of the repetition level on the target cell in the mobility control information.

The base station device 2 may not transmit the PDCCH or the EPDCCH for scheduling the random access response on the target cell. The terminal device 1 may directly monitor the random access response without monitoring the PDCCH or the EPDCCH. The terminal device 1 may monitor the random access response on the basis of a random access resource (preamble ID and transmission subframe) and the repetition level indicated by the dedicated random access channel configuration information.

Furthermore, the base station device 2 may include a random access parameter corresponding to the number of repetitions necessary for performing a random access resource selection on the target cell in the common radio resource configuration information. In other words, the base station device 2 may include the multiple random access parameters corresponding to the repetition levels in the common radio resource configuration information. The multiple random access parameters include, for example, information relating to a random access preamble group, a subframe for transmitting the random access preamble, an frequency resource allocation of the uplink in which the random access is performed, a frequency-hopping pattern, and the like.

An example of a UE timer determination method of the terminal device 1 in the handover procedure will be described with reference to FIG. 7.

Figure 7:
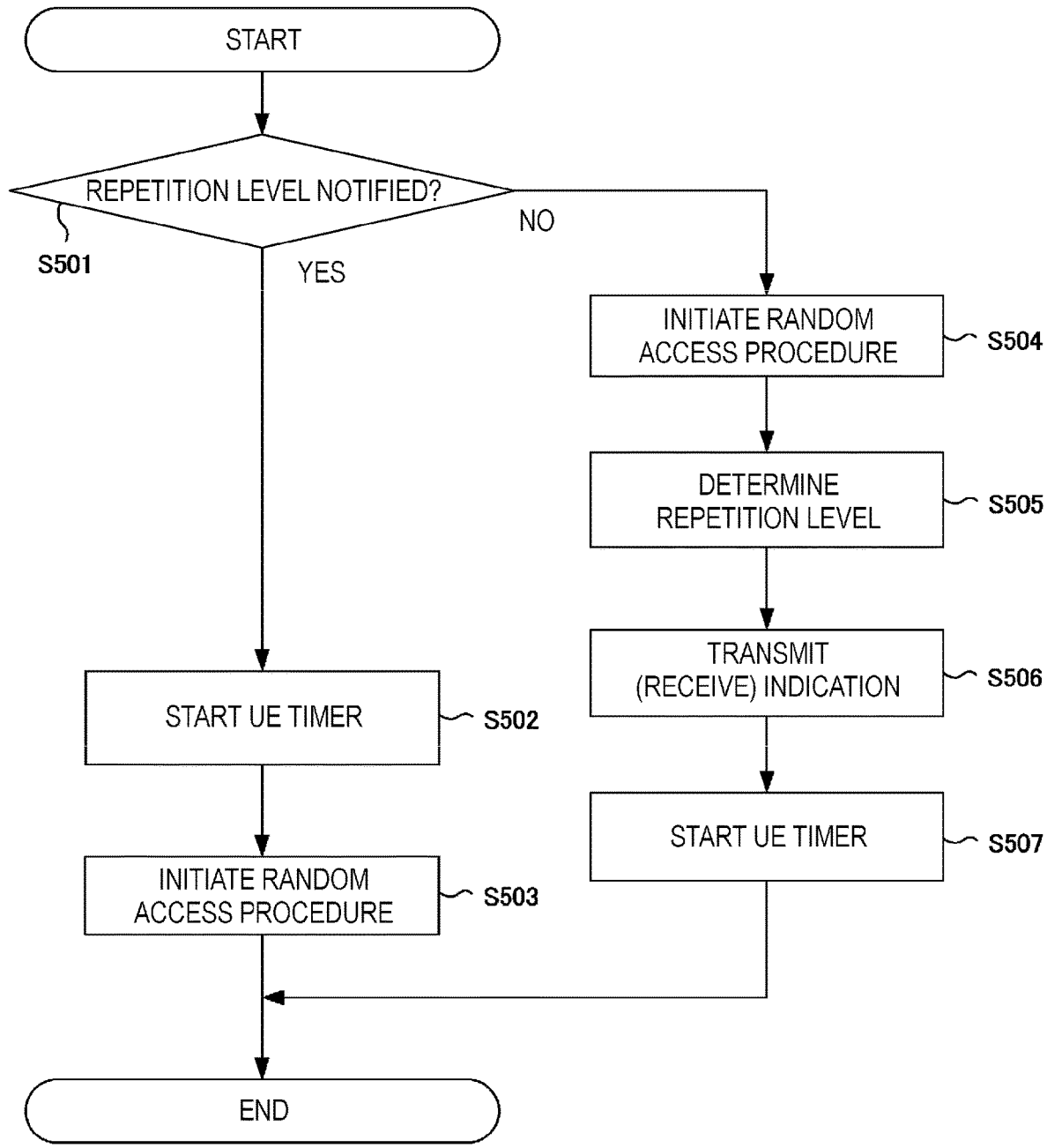
FIG. 7 is a flowchart diagram illustrating an example of a start process of a UE timer in a terminal device according to a second embodiment of the present invention.

The terminal device 1 in FIG. 7 receives the RRC connection reconfiguration message including the mobility control information from the base station device 2. When information indicating the repetition level is configured (notified, indicated) in the RRC connection reconfiguration message (Yes in step S501), the terminal device 1 (RRC entity) starts the configured timer T304bis (second handover procedure timer as a timer (UE timer) relating to the handover procedure (step S502).

Then, the terminal device 1 (RRC entity) reconfigures the radio resource configuration of the terminal device 1 in accordance with a configuration (information element) included in the RRC connection reconfiguration message, creates an RRC connection reconfiguration complete message, and provides (submits) the RRC connection reconfiguration complete message to the lower layer.

Note that, the terminal device 1 (RRC entity) configures (notifies, indicates), for the lower layer, the repetition level information notified with the RRC connection reconfiguration message at this time. The lower layer (for example, MAC entity) for which the repetition level is configured initiates the random access procedure for the target cell (step S503).

When the information indicating the repetition level is not configured in the RRC connection reconfiguration message (No in step S501), the repetition level in the handover procedure needs to be determined (selected) in the terminal device 1.

At this time, the terminal device 1 (RRC entity) reconfigures the radio resource configuration of the terminal device 1 in accordance with the configuration (information element) included in the RRC connection reconfiguration message, without starting the UE timer, creates the RRC connection reconfiguration complete message, and provides (submits) the RRC connection reconfiguration complete message to the lower layer.

The random access procedure is initiated after the RRC connection reconfiguration complete message is provided (submitted) from the RRC entity of the terminal device 1 to the lower layer of the terminal device 1. Therefore, after receiving the information (indication) relating to the repetition level from the lower layer, the terminal device 1 (RRC entity) needs to start the timer T304bis based on the received repetition level.

The lower layer (for example, MAC entity) initiates the random access procedure, when detecting that the transmission data is accumulated in a buffer in the higher layer (step S504). In other words, the RRC entity of the terminal device 1 provides (submits) the RRC connection reconfiguration complete message to the lower layer, which in turn causes the MAC entity of the terminal device 1 to initiate the random access procedure for transmitting the RRC connection reconfiguration complete message.

The terminal device 1 determines the repetition level during the random access procedure (step S505). The repetition level in the terminal device 1 can be determined (selected) by using either (1) a repetition level determined on the basis of the measurement result in the random access resource selection or (2) a repetition level notified (allocated) from the base station device 2 during the random access procedure.

Note that, when the repetition level is notified (configured, indicated) from the base station device 2 during the random access procedure, the repetition level may be notified with the MAC control element, may be indicated by the random access response, or may be indicated by the downlink control information notified on the PDCCH or the EPDCCH. Alternatively, the repetition level may be implicitly notified by the subframe number and/or the frequency resource in which the random access response is transmitted. The terminal device 1 maintains the current repetition level as it is, when the repetition level is not notified.

When the repetition level is determined during the random access procedure, the MAC entity of the terminal device 1 transmits the indication indicating the repetition level to the higher/upper layer (for example, RRC entity) of the terminal device 1 (step S506).

For example, when the terminal device 1 selects the (temporary) repetition level for transmitting the random access preamble, the MAC entity of the terminal device 1 transmits the indication to the higher layer of the terminal device 1. Furthermore, for example, when the repetition level is notified (indicated) from the base station device 2 during the random access procedure, the MAC entity of the terminal device 1 transmits the indication to the higher layer of the terminal device 1. Here, the indication includes at least the repetition level of the terminal device 1 on the cell or information indicating the repetition level.

In other words, in step S506, the terminal device 1 (RRC entity) receives the indication including the repetition level information from the lower layer when initiating the random access procedure (when performing the random access resource selection) or during the random access procedure.

The terminal device 1 (RRC entity) which has received the indication determines the value of the timer T304bis as the timer (UE timer) relating to the handover procedure on the basis of the received repetition level, and starts the operation of the timer T304bis (step S507).

Note that, it is preferable that the value configured for the timer T304bis be configurable such that the maximum time thereof is longer than the value configured for the timer T304. For example, when as the timer T304 (first handover procedure timer), any value of 50 ms, 100 ms, 150 ms, 200 ms, 500 ms, 1000 ms, and 2000 ms can be configured, it is preferable that, as the timer T304bis (second handover procedure timer), any value of 500 ms, 1000 ms, 2000 ms, 3000 ms, 5000 ms, 10000 ms, and 20000 ms be configurable. In this case, the same value may be configured for the timer T304 and the timer T304bis.

Alternatively, the value configured for the timer T304bis may be a value in a different range from that of the value configured for the timer T304, and furthermore may always exceed a value range configurable for the timer T304. In other words, the same value cannot be configured for the timer T304 and the timer T304bis. For example, when as the timer T304 (first handover procedure timer), any value of 50 ms, 100 ms, 150 ms, 200 ms, 500 ms, 1000 ms, and 2000 ms can be configured, it is preferable that, as the timer T304bis (second handover procedure timer), any value of 3000 ms, 4000 ms, 5000 ms, 10000 ms, 15000 ms, 20000 ms, and 30000 ms be configurable.

When the base station device 2 makes notification of (configures) both the timer T304 (referred to as the first handover procedure timer) and the timer T304bis (referred to as the second handover procedure timer), the terminal device 1 may perform the handover procedure using the timer T304bis for the handover on the coverage enhanced cell (that is, the target cell is the coverage enhanced cell), or may perform the handover procedure using the timer T304 for the handover on the normal cell (that is, the target cell is not the coverage enhanced cell).

Furthermore, when the base station device 2 makes notification of (configures) both the timer T304 and the timer T304bis, the terminal device 1 may use a timer value obtained by adding the value of the timer T304bis to the value of the timer T304 as the value of the T304. Furthermore, the terminal device 1 may use the timer T304bis as the timer T304 when both the timer T304 and the timer T304bis are notified (configured).

In such a constitution, when the terminal device 1 supports the coverage enhancement, the terminal device 1 can suitably configure the UE timer, on the basis of the UE timer dedicatedly notified from the base station device 2 or the indication relating to the random access procedure, in the handover procedure for the base station device 2 (target cell) which supports the coverage enhancement and is a handover destination. Furthermore, when indicating the handover procedure for the terminal device 1 supporting the coverage enhancement, the base station device 2 can dedicatedly transmit the UE timer used in the base station device 2 (target cell) of the handover destination with the RRC message.

Furthermore, the terminal device 1 determines the repetition level by performing the random access procedure on the target cell, which enables the terminal device 1 to select and use the suitable UE timer from among the multiple UE timers individually corresponding to the repetition levels. Furthermore, the terminal device 1 can start the UE timer at suitable timing on the basis of the indication relating to the random access procedure transmitted from the lower layer. Furthermore, the base station device 2 can cause the terminal device 1 to select the suitable UE timer from among the multiple UE timers corresponding to the repetition levels, by dedicatedly notifying the terminal device 1 of the configuration of the target cell which is a coverage enhanced cell.

This enables the base station device 2 and the terminal device 1 to execute the RRC procedure using the suitable UE timer, and thus the efficient radio resource control procedure can be realized.

Note that, the above-described embodiments are merely examples, and can be realized using various modification examples and replacement examples. For example, the transmission scheme to be used can also be applied to a communication system using the frequency division duplex (FDD) scheme, the time division duplex (TDD) scheme, or a combination thereof in which each of the schemes is used for each frequency. Furthermore, the names relating to each parameter and various operations indicated in the embodiments are used for the convenience of explanation. Even if the name actually applied and the name used in the embodiments of the present invention are different from each other, the gist of invention claimed in the embodiments of the present invention is not affected.

For example, the number of repetitions relating to the transmission and/or the reception for the coverage enhancement can be replaced with a repetition level, a coverage enhancement level, a coverage level, an enhancement coefficient (factor), an enhancement level, a repetition coefficient, an enhancement repetition coefficient, a bundling size, a bundling coefficient, a trial frequency, a trial level, an attempt level, or a synonymous expression therewith.

Furthermore, "entity" used in each embodiment is a synonym of "sublayer." In other words, description can be given in which the RRC entity, the PDCP entity, the RLC entity, and the MAC entity are replaced with an RRC sublayer, a PDCP sublayer, an RLC sublayer, and a MAC sublayer, respectively.

Furthermore, "connection" used in each embodiment is not intended to be limited to only a constitution in which one device and another device are directly connected using a physical line, but also is used for a constitution in which the devices are logically connected with each other and a constitution in which the devices are wirelessly connected with each other using radio technology.

Furthermore, specific numerical values used in the description are merely examples of numerical value used for the convenience of explanation, and any suitable value may be used.

Furthermore, examples of the terminal device 1 include not only a portable-type or movable-type mobile station device, but also a fixed-type or a stationary-type electronic apparatus installed indoors or outdoors, for example, an audio-video (AV) apparatus, a kitchen apparatus, a cleaning or washing machine, an air-conditioning apparatus, office equipment, a vending machine, other household apparatuses or measurement apparatuses, an on-vehicle device, and devices, such as a wearable apparatus, and a wearable health care apparatus, having a communication function implemented therein. Furthermore, the terminal device 1 may be used not only for machine-to-machine communication (machine type communication), but also for human-to-human communication, human-to-machine communication, vehicle-to-human communication, vehicle-to-vehicle communication, and on-road equipment-to-vehicle (road-to-vehicle) communication.

Furthermore, the terminal device 1 is also referred to as a user terminal, a mobile station device, a communication terminal, a mobile machine, a terminal, user equipment (UE), or a mobile station (MS). The base station device 2 is also referred to as a radio base station device, a base station, a radio base station, a fixed station, a NodeB (NB), an evolved NodeB (eNB), a base transceiver station (BTS), or a base station (BS).

Note that, the base station device 2 is referred to as an NB in UMTS, and referred to as an eNB in EUTRA and Advanced EUTRA defined by the 3GPP. Note that, the terminal device 1 in UMTS, EUTRA and Advanced EUTRA defined by the 3GPP is referred to as UE.

Furthermore, although, for the convenience of explanation, the method, the means, and the algorithm steps for realizing the functions or some of the functions of the units of the terminal device 1 and the base station device 2 have been described with a specific combination thereof using the functional block diagrams, these can be directly embodied by hardware, a software module executed by a processor, or combinations thereof.

When implemented by hardware, the terminal device 1 and the base station device 2 are each constituted of a power supply device or a battery supplying power thereto, a display device such as a liquid crystal display and a display driver, a memory, an input and output interface and input and output terminals, a speaker, and other peripheral devices, other than the constitution of the block diagram describe above.

When implemented by software, the functions of the terminal device 1 and the base station device 2 can be held as one or more commands or codes on a computer-readable medium or can be transmitted. The computer-readable medium includes both a communication medium and a computer recording medium including a medium which helps carrying of a computer program from one place to another place.

By recording one or more commands or codes on the computer-readable recording medium, and causing the computer system to read and execute the one or more commands or codes recorded on the recording medium, the terminal device 1 and the base station device 2 may be controlled. Moreover, the "computer system" here refers to a computer system including an OS and hardware components such as a peripheral device.

The operations described in each embodiment of the present invention may be realized with a program. The programs run on the terminal device 1 and the base station device 2 according to each embodiment of the present invention are each configured to control a CPU (program causing a computer to function) to realize the functions of the above-described embodiments according to each embodiment of the present invention. The information handled by these devices is temporarily held in a RAM at the time of processing, and is then stored in various types of ROM or HDD, read out by the CPU as necessary, and edited and written.

In addition to realizing the functions of the above-described embodiments by executing programs, the functions of each embodiment of the present invention may be realized by the programs running cooperatively with an operating system, other application programs, or the like in accordance with instructions included in those programs.

Furthermore, the "computer-readable recording medium" refers to a portable medium such as a semiconductor medium (for example, a RAM, a nonvolatile memory card, or the like), an optical recording medium (for example, a DVD, an MO, an MD, a CD, a BD, or the like), and a magnetic recording medium (for example, a magnetic tape, a flexible disk, or the like), and a storage device such as a disk unit built into the computer system. Moreover, the "computer-readable recording medium" includes a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client.

Furthermore, the above-described program may be configured to realize some of the functions described above, and additionally may be configured to be capable of realizing the functions described above in combination with a program already recorded in the computer system.

Furthermore, each of the function blocks or features of the terminal device 1 and the base station device 2 used in each of the above-described embodiments can be implemented or executed by a general-purpose processor, a digital signal processor (DSP), an application specific integrated circuit (ASIC), or any integrated circuit (IC) for general-use, a field-programmable gate array signal (FPGA), or other programmable logical devices, a discrete gate or a transistor logic, a discrete hardware component, or a combination thereof, which is designed to be able to perform at least the functions described in this specification.

Although the general-purpose processor may be a microprocessor, the processor may instead be a conventional processor, a controller, a microcontroller, or a state machine. The general-purpose processor or each circuit described above may be constituted of a digital circuit, may be constituted of an analog circuit, or may include both of them.

Alternatively, the processor may be implemented as a combination of computing devices. For example, a DSP and a microprocessor, multiple microprocessors, one or more microprocessors connected to a DSP core, or other combinations of such constitutions may be used.

Although the embodiments of this invention have been described in detail on the basis of the specific examples, it is apparent that the gist of each embodiment of the present invention and the scope of claims are not limited to these specific examples, design changes and the like without departing from the gist of this invention are also included. In other words, the description in this specification has been made for the purpose of exemplary descriptions, and is not intended to impose any limitation on each embodiment of the present invention.

Furthermore, various modifications are possible within the scope of the present invention defined by claims, and embodiments that are made by suitably combining technical means disclosed according to the different embodiments are also included in the technical scope of the present invention. Furthermore, a constitution in which the constituent elements that are described in each of the embodiments and exert the same effect are replaced with each other is also included in the technical scope of the present invention.

REFERENCE SIGNS LIST

1 Terminal device
2 Base station device
101, 201 Reception unit
102, 202 Demodulation unit
103, 203 Decoding unit
104, 204 Reception data control unit
105, 205 Physical layer control unit
106, 206 Transmission data control unit
107, 207 Coding unit
108, 208 Modulation unit
109, 209 Transmission unit
110, 210 Radio resource control unit
211 Network signal transmission and reception unit
T01, T02 Transmit antenna
R01, R02 Receive antenna

The invention claimed is:

1. A terminal device communicating with a base station device, the terminal device comprising:
a first sublayer; and
a second sublayer being a lower sublayer than the first sublayer,
the first sublayer acquiring, from the base station device, a common radio resource configuration for all terminal devices, the common radio resource configuration including:
first information for a timer T300 used in a Radio Resource Control (RRC) connection establishment procedure on a serving cell, the first information including a first value range of the timer for the terminal device that supports coverage enhancement using repetitive transmissions and a second value range of the timer for another terminal device that does not support the coverage enhancement using repetitive transmissions, the first value range always exceeding the second value range, and the second value range is not more than 2000 ms;
second information indicating mapping between values of levels and numbers of repetitions; and
third information indicating mapping between the values of levels and random access preamble groups,
the first sublayer starting the timer and creating an RRC connection request message corresponding to the RRC connection establishment procedure, and
the second sublayer determining one of the values of the levels that corresponds to one of the numbers of repetitions in a random access procedure related to the RRC connection establishment procedure, selecting one of the random access preamble groups that corresponds to the determined one of the values of the levels, and selecting a random access preamble from the selected one of the random access preamble groups.

2. The terminal device according to claim 1, wherein when determining that the random access procedure has succeeded, the second sublayer indicates the determined one of the values of the levels to the first sublayer.

3. The terminal device according to claim 1, wherein the second sublayer indicates, to the first sublayer, one of the values of the levels indicated by a random access response received in the random access procedure.

4. The terminal device according to claim 1, wherein the first sublayer is an RRC sublayer and the second sublayer is a medium access control (MAC) sublayer.

5. The terminal device according to claim 1, wherein the second sublayer determines the one of the values of the levels based on (i) system information included in the common radio resource configuration and (ii) measured reception quality of a downlink reference signal.

6. A base station device communicating with terminal devices, the base station device comprising:
a processor; and
memory in electronic communication with the processor, wherein instructions stored in the memory are executable to:
transmit, to the terminal devices, a common radio resource configuration for the terminal devices, the common radio resource configuration including:
first information for a timer T300 used in a Radio Resource Control (RRC) connection establishment procedure, the first information including a first value range of the timer for one of the terminal devices that supports coverage enhancement using repetitive transmissions and a second value range of the timer for another one of the terminal devices that does not support the coverage enhancement using repetitive transmissions, the first value range always exceeding the second value range, and the second value range is not more than 2000 ms;
second information indicating mapping between values of levels and numbers of repetitions; and
third information indicating mapping between the values of levels and random access preamble groups,
receive, from the terminal devices, random access preambles corresponding to a random access procedure related to the RRC connection establishment procedure, one of the terminal devices being configured to determine one of the values of the levels that corresponds to one of the numbers of repetitions in the random access procedure, select one of the random access preamble groups that corresponds to the determined one of the values of the levels, and select one of the random access preambles from the selected one of the random access preamble groups, and
receive, from the terminal devices, RRC connection request messages corresponding to the RRC connection establishment procedure, each of the terminal devices being configured to start the timer and transmit one of the RRC connection request messages.

7. A communication method of a terminal device communicating with a base station device, the terminal device including a first sublayer and a second sublayer being a lower sublayer than the first sublayer,
the communication method comprising:
in the first sublayer, acquiring, from the base station device, a common radio resource configuration for all terminal devices, the common radio resource configuration including:
first information for a timer T300 used in a Radio Resource Control (RRC) connection establishment procedure on a serving cell, the first information including a first value range of the timer for the terminal device that supports coverage enhancement using repetitive transmissions and a second value range of the timer for another terminal device that does not support the coverage enhancement using repetitive transmissions, the first value range always exceeding the second value range, and the second value range is not more than 2000 ms;
second information indicating mapping between values of levels and numbers of repetitions; and
third information indicating mapping between the values of levels and random access preamble groups,
in the first sublayer, starting the timer and creating an RRC connection request message corresponding to the RRC connection establishment procedure, and
in the second sublayer, determining one of the values of the levels that corresponds to one of the numbers of repetitions in a random access procedure related to the RRC connection establishment procedure, selecting one of the random access preamble groups that corresponds to the determined one of the values of the levels, and selecting a random access preamble from the selected one of the random access preamble groups.

8. The communication method according to claim 7, further comprising
indicating the determined one of the values of the levels to the first sublayer when the second sublayer determines that the random access procedure has succeeded.

9. The communication method according to claim 7, wherein
in the second sublayer, determining the one of the values of the levels is based on (i) system information included in the common radio resource configuration and (ii) measured reception quality of a downlink reference signal.

10. A communication method of a base station device communicating with terminal devices, the communication method comprising:
transmitting, to the terminal devices, a common radio resource configuration for the terminal devices, the common radio resource configuration including:
first information for a timer T300 used in a Radio Resource Control (RRC) connection establishment procedure, the first information including a first value range of the timer for one of the terminal devices that supports coverage enhancement using repetitive transmissions and a second value range of the timer for another one of the terminal devices that does not support the coverage enhancement using repetitive transmissions, the first value range always exceeding the second value range, and the second value range is not more than 2000 ms;
second information indicating mapping between values of levels and numbers of repetitions; and
third information indicating mapping between the values of levels and random access preamble groups,
receiving, from the terminal devices, random access preambles corresponding to a random access procedure related to the RRC connection establishment procedure, one of the terminal devices being configured to determine one of the values of the levels that corresponds to one of the numbers of repetitions in the random access procedure, select one of the random access preamble groups that corresponds to the determined one of the values of the levels, and select one of the random access preambles from the selected one of the random access preamble groups, and
receiving, from the terminal devices, RRC connection request messages corresponding to the RRC connection establishment procedure, each of the terminal devices being configured to start the timer and transmit one of the RRC connection request messages.

* * * * *